US012415541B1

(12) United States Patent
Jin et al.

(10) Patent No.: US 12,415,541 B1
(45) Date of Patent: Sep. 16, 2025

(54) LANE CHANGE ARCHITECTURE FOR AUTONOMOUS VEHICLES

(71) Applicant: Aurora Operations, Inc., Pittsburgh, PA (US)

(72) Inventors: Pengju Jin, San Francisco, CA (US); Paul Vernaza, Sunnyvale, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

(21) Appl. No.: 18/933,716

(22) Filed: Oct. 31, 2024

(51) Int. Cl.
*B60W 60/00* (2020.01)
*B60W 30/18* (2012.01)
*G01C 21/34* (2006.01)
*G01C 21/36* (2006.01)

(52) U.S. Cl.
CPC .. *B60W 60/0011* (2020.02); *B60W 30/18163* (2013.01); *B60W 60/0027* (2020.02); *G01C 21/3453* (2013.01); *G01C 21/3658* (2013.01)

(58) Field of Classification Search
CPC ....... B60W 60/0011; B60W 30/18163; B60W 60/0027; G01C 21/3453; G01C 21/3658
See application file for complete search history.

(56) References Cited

U.S. PATENT DOCUMENTS

| 2018/0238697 | A1* | 8/2018 | Maru | G01C 21/3461 |
| 2020/0307589 | A1* | 10/2020 | Li | B60W 60/0023 |
| 2021/0163010 | A1* | 6/2021 | Takabayashi | G08G 1/16 |
| 2021/0269059 | A1* | 9/2021 | Djuric | B60W 60/0011 |
| 2022/0266874 | A1* | 8/2022 | Blandizzi | B60W 60/00274 |
| 2023/0123418 | A1* | 4/2023 | Kolbe | B60W 60/001 701/25 |

* cited by examiner

*Primary Examiner* — Khoi H Tran
*Assistant Examiner* — Tien Minh Le
(74) *Attorney, Agent, or Firm* — Dority & Manning, P.A.

(57) ABSTRACT

An example method for controlling an autonomous vehicle includes generating, using perception data, a dynamic cost profile associated with an object in the environment; obtaining map data describing lanes of the multilane roadway; generating, using the map data, a lane cost profile that includes a plurality of basins respectively associated with the lanes; generating a candidate trajectory for the autonomous vehicle to traverse in the environment; evaluating the candidate trajectory using an aggregate cost of the candidate trajectory, the aggregate cost computed using the lane cost profile and the dynamic cost profile; determining a selected trajectory for execution by the autonomous vehicle based on the evaluation of the candidate trajectory; controlling the autonomous vehicle according to the selected trajectory.

20 Claims, 12 Drawing Sheets

LANE CHANGE ARCHITECTURE FOR AUTONOMOUS VEHICLES

BACKGROUND

An autonomous platform may process data to perceive an environment through which the autonomous platform travels. For example, an autonomous vehicle may perceive its environment using a variety of sensors and identify objects around the autonomous vehicle. The autonomous vehicle may identify an appropriate path through the perceived surrounding environment and navigate along the path with minimal or no human input.

SUMMARY

Example implementations of the present disclosure provide a global cost framework for evaluating candidate autonomous vehicle trajectories that facilitate natural lane change decisions. For human drivers, lane change decisions may be a simple maneuver. With years of driving experience, knowing which lane to be in at a given moment, and when to time a movement into another lane, may be an easy and natural part of navigating multilane roadways. But this ease and familiarity may disguise the complex, multifaceted balancing of movement and timing that may be a part of the lane change process. For instance, lane width, roadway speed limits, weather, visibility, route, traffic patterns, etc. may all affect when and how a lane change is executed.

Advantageously, example implementations of the present disclosure provide a costing framework that may perform complex lane-change decision-making implicitly within the costing and comparison of candidate trajectories. Multiple different component costs may quantify the influence of multiple different factors on the desirability of being at a given location in the environment. An aggregate cost over all the components may quantify an overall evaluation of a given candidate trajectory. For example, a system according to this disclosure may rank multiple candidate trajectories based on aggregate cost, and a lane change may be "decided" based on selecting a trajectory that changes lanes when it is ranked above other candidate trajectories that do not change lanes. In an aspect, this technical solution may provide a technical improvement at least to determine a cost structure for a change of a lane by an autonomous vehicle in a real-world environment. This technical solution may provide a technical improvement of responsiveness or reduction of computational complexity. For instance, an example cost structure may implicitly encode different choices for changing lanes and eliminate a requirement for a discrete decision to change lanes.

To support this implicit decision-making, the costing framework may include semantically meaningful component costs, which may correspond to some of the same lane-change motivators that influence human driving behavior. For instance, the costing framework may include route costs that, for example, penalize lane positions that increase a difficulty of navigating along a given route (e.g., leftmost lane positions when the next turn on the route is a right turn). The costing framework may include traffic costs that, for example, penalize traveling in a lane with a slower effective travel speed. The costing framework may include dynamic costs generated to penalize movement to areas of an environment associated with objects in the environment (e.g., other vehicles). The costing framework may include soft boundary costs that penalize movements that approach or straddle lane boundaries. Further, this costing framework may improve autonomous navigation by supporting a wider spectrum of lane movement and may not be limited to implementing discrete or binary lane changes. For example, movements that approach or straddle lane boundaries may stop short of a complete lane change.

To represent discrete lane options in a continuous global costing space, the costing framework may include a lane cost that is derived from and registered to map data. The map data may contain locations of lane boundaries in the environment. An ego vehicle may localize itself within the environment, registering its local coordinate system to a reference coordinate of the environment. The lane cost may use this registration to position a cost basin in line with each lane in the roadway. An example cost basin may include a cost function that has a region of lower cost in between regions of relatively higher costs. In this manner, for instance, a motion planning system may organically determine to initiate a lane change based on the respective costs associated with staying in the ego lane and leaving the ego lane. The cost basins introduced by the lane costs may encourage selection of trajectories that remain within a lane until a cost of a trajectory remaining within the lane is greater than the cost of a trajectory that crosses into an adjoining lane.

Example implementations of control methods and autonomous vehicle control systems according to aspects of the present disclosure may provide a number of improvements to autonomous vehicles. For example, a technical solution including a costing framework with semantically meaningful component costs may provide a technical improvement to interpretability and predictability of actions taken by the autonomous vehicle. Interpretability and predictability can, in turn, facilitate more efficient model training and improvement (e.g., by more readily exposing the current state of the logic of the control system), and provide for higher confidence testing and validation for deployment. These advantages of this technical solution may provide at least a technical improvement of higher performance control systems for controlling autonomous vehicles as well as accelerating the advancement of the technical field of autonomous transportation as a whole.

Further, using a costing framework with semantically meaningful component costs may leverage the known priors for those semantic contexts to intelligently reduce computational cost. For instance, in a multi-lane roadway context, a lane boundary cost over the width of the lane (e.g., answering, "How well am I staying within this lane?") may effectively be constant for all similarly-situated lanes. As such, the same lane boundary cost may be used for subsequent positions in a continuous lane, absent any changes in external factors. Similarly, a route cost (e.g., answering, "How well does this lane support navigation on my route?") may effectively be constant across a width of a lane, such that a single value may represent the goodness of a particular longitudinal position in a lane across the width. As such, the same value may be used to cost various laterally distributed points that share that particular longitudinal position. In contrast, dynamic costs (e.g., answering, "How well am I avoiding other objects in the scene?") may vary more granularly. As such, dynamic costs may be computed with higher precision. In this manner, for instance, computational resources may be more efficiently allocated for the computation of dynamic costs by more sparsely computing other costs. This resource allocation may be facilitated by using a costing framework that distinguishes semantically meaningful component costs with individually-adjustable precisions. Such resource allocation may support an overall efficiency improvement for autonomous vehicle control systems, such as by reducing a FLOPs count per planning cycle in a motion planner, using a same number of FLOPs to consider more candidate trajectories, more contextual information, reducing a memory footprint of cost data persisted throughout a planning cycle, reducing a size of log data files, etc.

In an aspect, the present disclosure provides an example method for controlling an autonomous vehicle. In some implementations, the example method includes (a) obtaining perception data that describes an environment of the autonomous vehicle, wherein the environment includes a multilane roadway. In some implementations, the example method includes (b) generating, using the perception data, a dynamic cost profile associated with an object in the environment. In some implementations, the example method includes (c) obtaining map data describing lanes of the multilane roadway. In some implementations, the example method includes (d) generating, using the map data, a lane cost profile that includes a plurality of basins respectively associated with the lanes, wherein the lane cost profile is continuous between adjoining basins. In some implementations, the example method includes (e) generating a candidate trajectory for the autonomous vehicle to traverse in the environment, wherein the candidate trajectory corresponds to a path from a first location in a first lane of the multilane roadway to a second location in a second lane of the multilane roadway. In some implementations, the example method includes (f) evaluating the candidate trajectory using an aggregate cost of the candidate trajectory, the aggregate cost computed using the lane cost profile and the dynamic cost profile. In some implementations, the example method includes (g) determining a selected trajectory for execution by the autonomous vehicle based on the evaluation of the candidate trajectory. In some implementations, the example method includes (h) controlling the autonomous vehicle according to the selected trajectory.

In an aspect, the present disclosure provides an example one or more non-transitory computer-readable media storing instructions that are executable by one or more processors to cause a computing system to perform operations for controlling an autonomous vehicle. In the example one or more non-transitory computer-readable media, the operations include any one or multiple of the implementations of the example method.

In an aspect, the present disclosure provides an example computing system. The example computing system includes one or more processors. The example computing system includes one or more non-transitory computer-readable media storing instructions that are executable by the one or more processors to cause the computing system to perform operations for controlling an autonomous vehicle. In the example computing system, the operations include any one or multiple of the implementations of the example method.

Other example aspects of the present disclosure are directed to other systems, methods, vehicles, apparatuses, tangible non-transitory computer-readable media, and devices for performing functions described herein. These and other features, aspects and advantages of various implementations will become better understood with reference to the following description and appended claims.

BRIEF DESCRIPTION OF THE DRAWINGS

The accompanying drawings, which are incorporated in and constitute a part of this specification, illustrate implementations of the present disclosure and, together with the description, serve to explain the related principles.

DETAILED DESCRIPTION

The following describes the technology of this disclosure within the context of an autonomous vehicle for example purposes only. As described herein, the technology described herein is not limited to an autonomous vehicle and may be implemented for or within other autonomous platforms and other computing systems.

Figure 1:
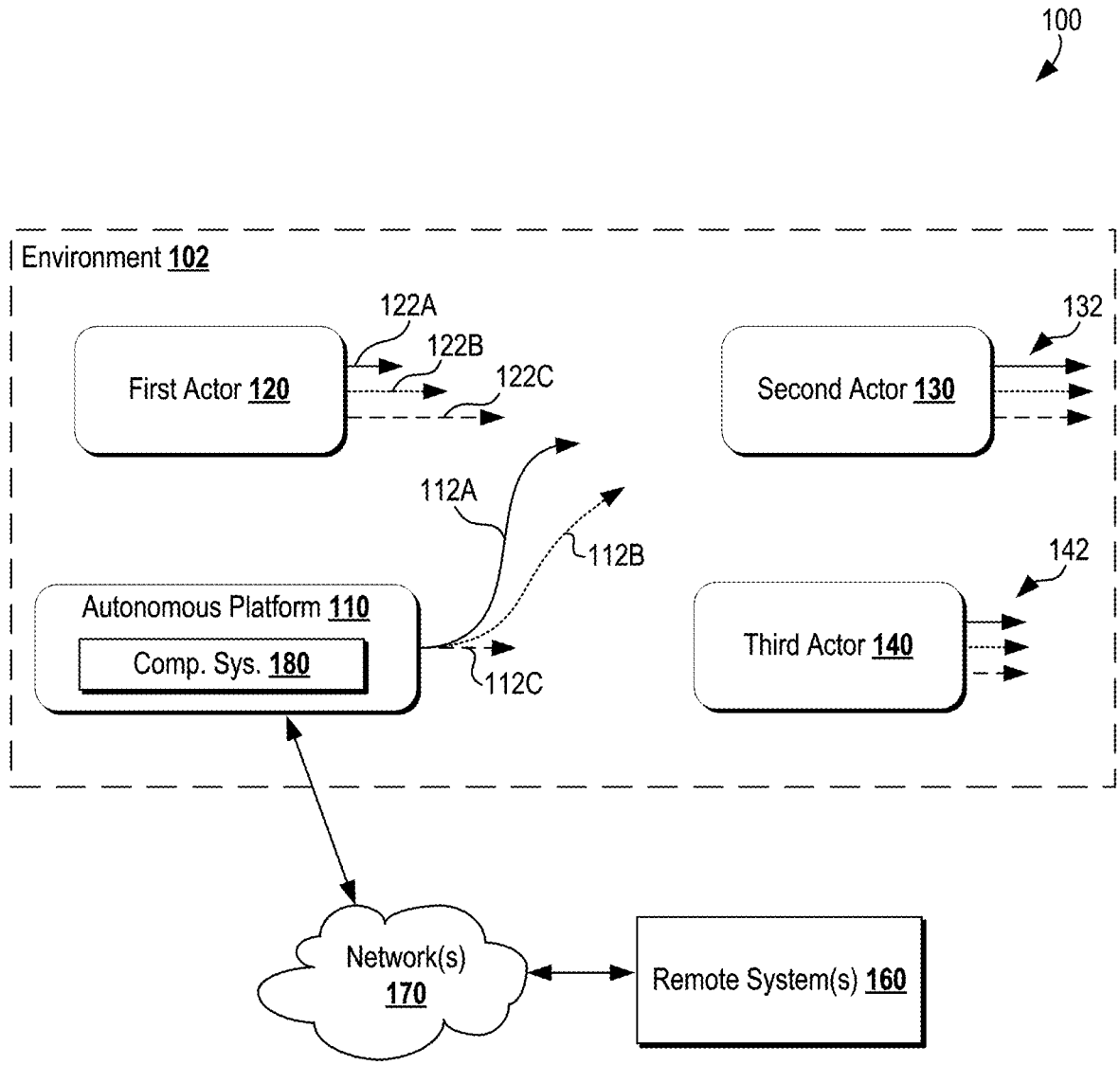
FIG. 1 is a block diagram of an example operational scenario, according to some implementations of the present disclosure.

With reference to FIGS. 1-12, example implementations of the present disclosure are discussed in further detail. FIG. 1 is a block diagram 100 of an example operational scenario, according to some implementations of the present disclosure. In the example operational scenario, an environment 102 contains an autonomous platform 110 and a number of objects, including first actor 120, second actor 130, and third actor 140. In the example operational scenario, the autonomous platform 110 may move through the environment 102 and interact with the object(s) that are located within the environment 102 (e.g., first actor 120, second actor 130, third actor 140, etc.). The autonomous platform 110 may optionally be configured to communicate with remote system(s) 160 through network(s) 170.

The environment 102 may be or include an indoor environment (e.g., within one or more facilities, etc.) or an outdoor environment. An indoor environment, for example, may be an environment enclosed by a structure such as a building (e.g., a service depot, maintenance location, manufacturing facility, etc.). An outdoor environment, for example, may be one or more areas in the outside world such as, for example, one or more rural areas (e.g., with one or more rural travel ways, etc.), one or more urban areas (e.g., with one or more city travel ways, highways, etc.), one or more suburban areas (e.g., with one or more suburban travel ways, etc.), or other outdoor environments.

The autonomous platform 110 may be any type of platform configured to operate within the environment 102. For example, the autonomous platform 110 may be a vehicle configured to autonomously perceive and operate within the environment 102. The vehicles may be a ground-based autonomous vehicle such as, for example, an autonomous car, truck, van, etc. The autonomous platform 110 may be an autonomous vehicle that may control, be connected to, or be otherwise associated with implements, attachments, and/or accessories for transporting people or cargo. This may include, for example, an autonomous tractor optionally coupled to a cargo trailer. Additionally, or alternatively, the autonomous platform 110 may be any other type of vehicle such as one or more aerial vehicles, water-based vehicles, space-based vehicles, other ground-based vehicles, etc.

The autonomous platform 110 may be configured to communicate with the remote system(s) 160. For instance, the remote system(s) 160 may communicate with the autonomous platform 110 for assistance (e.g., navigation assistance, situation response assistance, etc.), control (e.g., fleet management, remote operation, etc.), maintenance (e.g., updates, monitoring, etc.), or other local or remote tasks. In some implementations, the remote system(s) 160 may provide data indicating tasks that the autonomous platform 110 should perform. For example, as further described herein, the remote system(s) 160 may provide data indicating that the autonomous platform 110 is to perform a trip/service such as a user transportation trip/service, delivery trip/service (e.g., for cargo, freight, items), etc.

The autonomous platform 110 may communicate with the remote system(s) 160 using the network(s) 170. The network(s) 170 may facilitate the transmission of signals (e.g., electronic signals, etc.) or data (e.g., data from a computing device, etc.) and may include any combination of various wired (e.g., twisted pair cable, etc.) or wireless communication mechanisms (e.g., cellular, wireless, satellite, microwave, radio frequency, etc.) or any desired network topology (or topologies). For example, the network(s) 170 may include a local area network (e.g., intranet, etc.), a wide area network (e.g., the Internet, etc.), a wireless LAN network (e.g., through Wi-Fi, etc.), a cellular network, a SATCOM network, a VHF network, a HF network, a WiMAX based network, or any other suitable communications network (or combination thereof) for transmitting data to or from the autonomous platform 110.

As shown for example in FIG. 1, environment 102 may include one or more objects. The object(s) may be objects not in motion or not predicted to move ("static objects") or object(s) in motion or predicted to be in motion ("dynamic objects" or "actors"). In some implementations, the environment 102 may include any number of actor(s) such as, for example, one or more pedestrians, animals, vehicles, etc. The actor(s) may move within the environment according to one or more actor trajectories. For instance, the first actor 120 may move along any one of the first actor trajectories 122A-C, the second actor 130 may move along any one of the second actor trajectories 132, the third actor 140 may move along any one of the third actor trajectories 142, etc.

As further described herein, the autonomous platform 110 may utilize its autonomy system(s) to detect these actors (and their movement) and plan its motion to navigate through the environment 102 according to one or more platform trajectories 112A-C. The autonomous platform 110 may include onboard computing system(s) 180. The onboard computing system(s) 180 may include one or more processors and one or more memory devices. The one or more memory devices may store instructions executable by the one or more processors to cause the one or more processors to perform operations or functions associated with the autonomous platform 110, including implementing its autonomy system(s).

Figure 2:
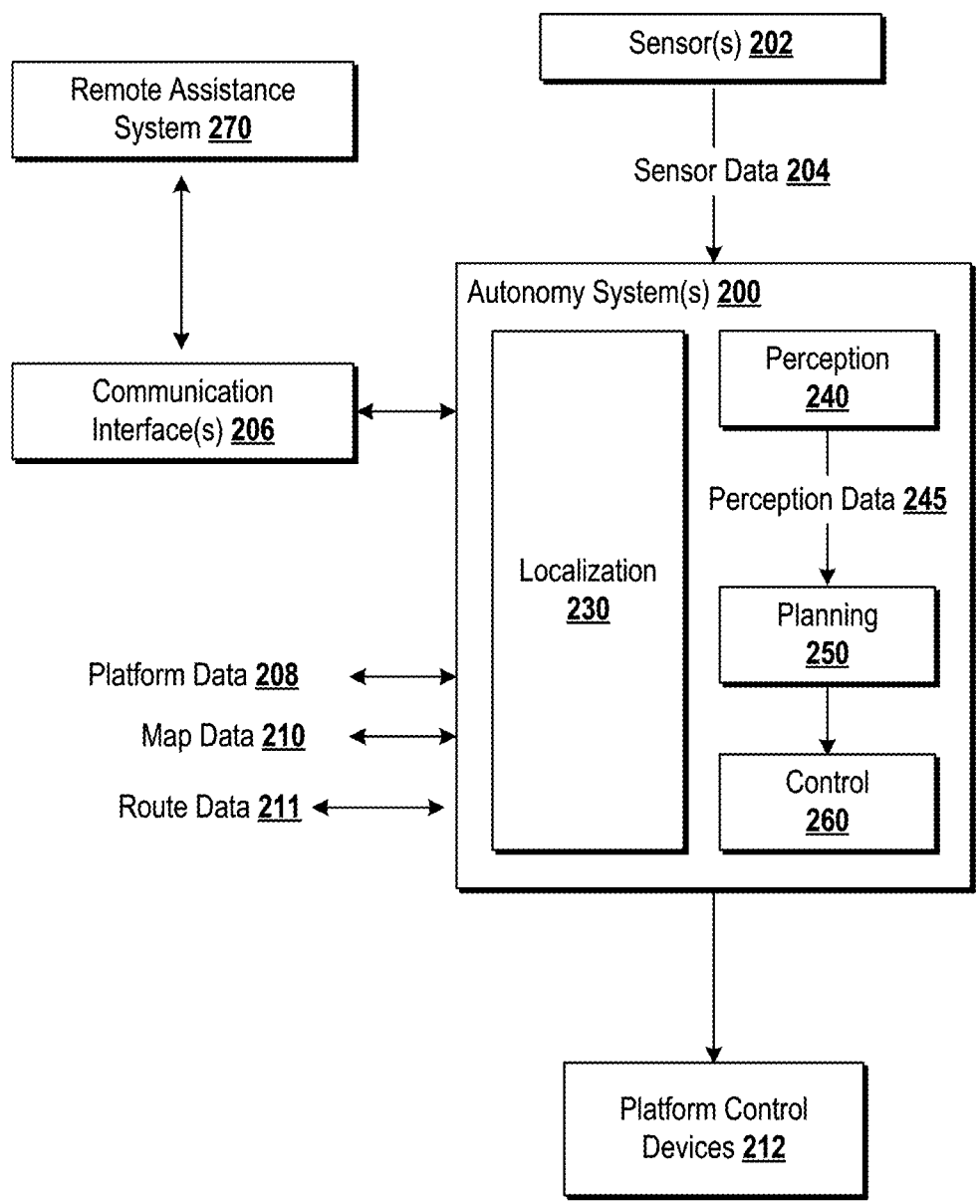
FIG. 2 is a block diagram of an example system, according to some implementations of the present disclosure.

FIG. 2 is a block diagram 201 of an example autonomy system 200 for an autonomous platform 110, according to some implementations of the present disclosure. In some implementations, the autonomy system 200 may be implemented by a computing system of the autonomous platform 110 (e.g., the onboard computing system(s) 180 of the autonomous platform 110). The autonomy system 200 may operate to obtain inputs from sensor(s) 202 or other input devices. In some implementations, the autonomy system 200 may additionally obtain platform data 208 (e.g., map data 210, route data 211, etc.) from local or remote storage. The autonomy system 200 may generate control outputs for controlling the autonomous platform 110 (e.g., through platform control devices 212, etc.) based on sensor data 204, map data 210, or other data. The autonomy system 200 may include different subsystems for performing various autonomy operations. The subsystems may include a localization system 230, a perception system 240, a planning system 250, and a control system 260. The localization system 230 may determine the location of the autonomous platform 110 within its environment; the perception system 240 may detect, classify, and track objects and actors in the environment; the planning system 250 may determine a trajectory for the autonomous platform 110; and the control system 260 may translate the trajectory into vehicle controls for controlling the autonomous platform 110. The autonomy system 200 may be implemented by one or more onboard computing system(s). The subsystems may include one or more processors and one or more memory devices. The one or more memory devices may store instructions executable by the one or more processors to cause the one or more processors to perform operations or functions associated with the subsystems. The computing resources of the autonomy system 200 may be shared among its subsystems, or a subsystem may have a set of dedicated computing resources.

In some implementations, the autonomy system 200 may be implemented for or by an autonomous vehicle (e.g., a ground-based autonomous vehicle). The autonomy system 200 may perform various processing techniques on inputs (e.g., the sensor data 204, the map data 210) to perceive and understand the vehicle's surrounding environment and generate an appropriate set of control outputs to implement a vehicle motion plan (e.g., including one or more trajectories) for traversing the vehicle's surrounding environment (e.g., environment 102 of FIG. 1, etc.). In some implementations, an autonomous vehicle implementing the autonomy system 200 may drive, navigate, operate, etc. with minimal or no interaction from a human operator (e.g., driver, pilot, etc.).

In some implementations, the autonomous platform 110 may be configured to operate in a plurality of operating modes. For instance, the autonomous platform 110 may be configured to operate in a fully autonomous (e.g., self-driving, etc.) operating mode in which the autonomous platform 110 is controllable without user input (e.g., may drive and navigate with no input from a human operator present in the autonomous vehicle or remote from the autonomous vehicle, etc.). The autonomous platform 110 may operate in a semi-autonomous operating mode in which the autonomous platform 110 may operate with some input from a human operator present in the autonomous platform 110 (or a human operator that is remote from the autonomous platform 110). In some implementations, the autonomous platform 110 may enter into a manual operating mode in which the autonomous platform 110 is fully controllable by a human operator (e.g., human driver, etc.) and may be prohibited or disabled (e.g., temporary, permanently, etc.) from performing autonomous navigation (e.g., autonomous driving, etc.). The autonomous platform 110 may be configured to operate in other modes such as, for example, park or sleep modes (e.g., for use between tasks such as waiting to provide a trip/service, recharging, etc.). In some implementations, the autonomous platform 110 may implement vehicle operating assistance technology (e.g., collision mitigation system, power assist steering, etc.), for example, to help assist the human operator of the autonomous platform 110 (e.g., while in a manual mode, etc.).

Autonomy system 200 may be located onboard (e.g., on or within) an autonomous platform 110 and may be configured to operate the autonomous platform 110 in various environments. The environment may be a real-world environment or a simulated environment. In some implementations, one or more simulation computing devices may simulate one or more of: the sensors 202, the sensor data 204, communication interface(s) 206, the platform data 208, or the platform control devices 212 for simulating operation of the autonomy system 200.

In some implementations, the autonomy system 200 may communicate with one or more networks or other systems with the communication interface(s) 206. The communication interface(s) 206 may include any suitable components for interfacing with one or more network(s) (e.g., the network(s) 170 of FIG. 1, etc.), including, for example, transmitters, receivers, ports, controllers, antennas, or other suitable components that may help facilitate communication. In some implementations, the communication interface(s) 206 may include a plurality of components (e.g., antennas, transmitters, or receivers, etc.) that allow it to implement and utilize various communication techniques (e.g., multiple-input, multiple-output (MIMO) technology, etc.).

In some implementations, the autonomy system 200 may use the communication interface(s) 206 to communicate with one or more computing devices that are remote from the autonomous platform 110 (e.g., the remote system(s) 160) over one or more network(s) (e.g., the network(s) 170). For instance, in some examples, one or more inputs, data, or functionalities of the autonomy system 200 may be supplemented or substituted by a remote system communicating over the communication interface(s) 206. For instance, in some implementations, the map data 210 may be downloaded over a network to a remote system using the communication interface(s) 206. In some examples, one or more of localization system 230, perception system 240, planning system 250, or control system 260 may be updated, influenced, nudged, communicated with, etc. by a remote system for assistance, maintenance, situational response override, management, etc.

The sensor(s) 202 may be located onboard the autonomous platform 110. In some implementations, the sensor(s) 202 may include one or more types of sensor(s). For instance, one or more sensors may include image capturing device(s) (e.g., visible spectrum cameras, infrared cameras, etc.). Additionally, or alternatively, the sensor(s) 202 may include one or more depth capturing device(s). For example, the sensor(s) 202 may include one or more Light Detection and Ranging (LIDAR) sensor(s) or Radio Detection and Ranging (RADAR) sensor(s). The sensor(s) 202 may be configured to generate point data descriptive of at least a portion of a three-hundred-and-sixty-degree view of the surrounding environment. The point data may be point cloud data (e.g., three-dimensional LIDAR point cloud data, RADAR point cloud data). In some implementations, one or more of the sensor(s) 202 for capturing depth information may be fixed to a rotational device in order to rotate the sensor(s) 202 about an axis. The sensor(s) 202 may be rotated about the axis while capturing data in interval sector packets descriptive of different portions of a three-hundred-and-sixty-degree view of a surrounding environment of the autonomous platform 110. In some implementations, one or more of the sensor(s) 202 for capturing depth information may be solid state.

The sensor(s) 202 may be configured to capture the sensor data 204 indicating or otherwise being associated with at least a portion of the environment of the autonomous platform 110. The sensor data 204 may include image data (e.g., 2D camera data, video data, etc.), RADAR data, LIDAR data (e.g., 3D point cloud data, etc.), audio data, or other types of data. In some implementations, the autonomy system 200 may obtain input from additional types of sensors, such as inertial measurement units (IMUs), altimeters, inclinometers, odometry devices, location or positioning devices (e.g., GPS, compass), wheel encoders, or other types of sensors. In some implementations, the autonomy system 200 may obtain sensor data 204 associated with particular component(s) or system(s) of an autonomous platform 110. This sensor data 204 may indicate, for example, wheel speed, component temperatures, steering angle, cargo or passenger status, etc. In some implementations, the autonomy system 200 may obtain sensor data 204 associated with ambient conditions, such as environmental or weather conditions. In some implementations, the sensor data 204 may include multi-modal sensor data. The multi-modal sensor data may be obtained by at least two different types of sensor(s) (e.g., of the sensors 202) and may indicate static object(s) or actor(s) within an environment of the autonomous platform 110. The multi-modal sensor data may include at least two types of sensor data (e.g., camera and LIDAR data). In some implementations, the autonomous platform 110 may utilize the sensor data 204 for sensors that are remote from (e.g., offboard) the autonomous platform 110. This may include for example, sensor data 204 captured by a different autonomous platform 110.

Map data 210 may describe an environment in which the autonomous platform 110 was, is, or will be located. Map data 210 may provide information about an environment or a geographic area. For example, map data 210 may provide information regarding the identity and location of different travel ways (e.g., roadways, etc.), travel way segments (e.g., road segments, etc.), buildings, or other items or objects (e.g., lampposts, crosswalks, curbs, etc.); the location and directions of boundaries or boundary markings (e.g., the location and direction of traffic lanes, parking lanes, turning lanes, bicycle lanes, other lanes, etc.); traffic control data (e.g., the location and instructions of signage, traffic lights, other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicating an ideal vehicle path such as along the center of a certain lane, etc.); or any other map data that provides information that assists an autonomous platform 110 in understanding its surrounding environment and its relationship thereto. Map data 210 may include ground height information (e.g., terrain mapping). Map data 210 may include high-definition map information. Map data 210 may include sparse map data (e.g., lane graphs, etc.). Sensor data 204 may be fused with or used to update map data 210 online or offline.

Route data 211 may describe one or more goal locations to which the autonomous vehicle is navigating. A route may include a path that includes one or more goal locations. A goal location may be indicated by a map coordinate (e.g., longitude, latitude, or other coordinate system for a map), an address, a vector, etc. A goal location may correspond to a position on a roadway, such as a position within a lane. A goal location may be selected from a continuous or effectively continuous distribution of positions in space or may be selected from a discrete set of positions. For instance, a vector-based map object may provide a continuous distribution of positions from which to select a goal. A raster-based map object may provide an effectively continuous (subject to the resolution of the data) distribution of positions from which to select a goal. A graph-based map object with a number of nodes representing discrete lane positions may provide a discrete distribution of positions from which to select a goal.

Autonomy systems 200 may process route data 211 to navigate a route. For instance, autonomy systems 200 may process route data 211 to generate instructions for navigating to a next goal location. The instructions for navigating may be explicit, such as designated points at which the vehicle is to exit a highway to enter a surface street. The instructions for navigating may be implicit, such as by encoding the instructions as costs used to bias the vehicle's inherent planning decisions to follow the route.

Localization system 230 may provide an autonomous platform 110 with an understanding of its location and orientation in an environment. In some examples, localization system 230 may support one or more other subsystems of autonomy system 200, such as by providing a unified local reference frame for performing, e.g., perception operations, planning operations, or control operations.

Localization system 230 may determine a current position of the autonomous platform 110. A current position may include a global position (e.g., respecting a georeferenced anchor, etc.) or relative position (e.g., respecting objects in the environment, etc.). The localization system 230 may generally include or interface with any device or circuitry for analyzing a position or change in position of an autonomous platform 110 (e.g., autonomous ground-based vehicle, etc.). For example, the localization system 230 may determine position by using one or more of: inertial sensors (e.g., inertial measurement unit(s), etc.), a satellite positioning system, radio receivers, networking devices (e.g., based on IP address, etc.), triangulation or proximity to network access points or other network components (e.g., cellular towers, Wi-Fi access points, etc.), or other suitable techniques. The position of the autonomous platform 110 may be used by various subsystems of the autonomy system 200 or provided to a remote computing system (e.g., using the communication interface(s) 206).

In some implementations, the localization system 230 may register relative positions of elements of a surrounding environment of an autonomous platform 110 with recorded positions in the map data 210. For instance, the localization system 230 may process the sensor data 204 (e.g., LIDAR data, RADAR data, camera data, etc.) for aligning or otherwise registering to a map of the surrounding environment (e.g., from the map data 210) to understand the location of the autonomous platform 110 within that environment. Accordingly, in some implementations, the autonomous platform 110 may identify its position within the surrounding environment (e.g., across six axes, etc.) based on a search over the map data 210. In some implementations, given an initial location, the localization system 230 may update the location of the autonomous platform 110 with incremental re-alignment based on recorded or estimated deviations from the initial location. In some implementations, a position may be registered directly within the map data 210.

In some implementations, the map data 210 may include a large volume of data subdivided into geographic tiles, such that a desired region of a map stored in the map data 210 may be reconstructed from one or more tiles. For instance, a plurality of tiles selected from the map data 210 may be stitched together by the autonomy system 200 based on a position obtained by the localization system 230 (e.g., a number of tiles selected in the vicinity of the position).

In some implementations, the localization system 230 may determine positions (e.g., relative or absolute) of one or more attachments or accessories for an autonomous platform 110. For instance, an autonomous platform 110 may be associated with a cargo platform, and the localization system 230 may provide positions of one or more points on the cargo platform. For example, a cargo platform may include a trailer or other device towed or otherwise attached to or manipulated by an autonomous platform 110, and the localization system 230 may provide for data describing the position (e.g., absolute, relative, etc.) of the autonomous platform 110 as well as the cargo platform. Such information may be obtained by the other autonomy systems to help operate the autonomous platform 110.

The autonomy system 200 may include the perception system 240, which may allow an autonomous platform 110 to detect, classify, and track objects and actors in its environment. Environmental features or objects perceived within an environment 102 may be those within the field of view of the sensor(s) 202 or predicted to be occluded from the sensor(s) 202. This may include object(s) not in motion or not predicted to move (static objects) or object(s) in motion or predicted to be in motion (dynamic objects/actors).

The perception system 240 may determine one or more states (e.g., current or past state(s), etc.) of one or more objects that are within a surrounding environment of an autonomous platform 110. For example, state(s) may describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); classification (e.g., pedestrian class vs. vehicle class vs. bicycle class, etc.); the uncertainties associated therewith; other state information; or any combination thereof. In some implementations, the perception system 240 may determine the state(s) using one or more algorithms or machine-learned models configured to identify/classify objects based on inputs from the sensor(s) 202. The perception system may use different modalities of the sensor data 204 to generate a representation of the environment to be processed by the one or more algorithms or machine-learned models. In some implementations, state(s) for one or more identified or unidentified objects may be maintained and updated over time as the autonomous platform 110 continues to perceive or interact with the objects (e.g., maneuver with or around, yield to, etc.). In this manner, the perception system 240 may provide an understanding about a current state of an environment (e.g., including the objects therein, etc.) informed by a record of prior states of the environment (e.g., including movement histories for the objects therein). Such information may be output as perception data 245. Perception data 245 may be used by various other systems of the autonomous platform 110 (e.g., localization system 230, planning system 250, etc.) as it plans its motion through the environment 102.

The autonomy system 200 may include the planning system 250, which may be configured to determine how the autonomous platform 110 is to interact with and move within its environment. The planning system 250 may determine one or more motion plans for an autonomous platform 110. A motion plan may include one or more trajectories (e.g., motion trajectories) that indicate a path for an autonomous platform 110 to follow. A trajectory may be of a certain length or time range. The length or time range may be defined by the planning system 250. A motion trajectory may be defined by one or more waypoints (with associated coordinates). The waypoint(s) may be future location(s) for the autonomous platform 110. The motion plans may be continuously generated, updated, and considered by the planning system 250.

The motion planning system 250 may determine a strategy for the autonomous platform 110. A strategy may include a set of discrete decisions (e.g., yield to actor, reverse yield to actor, merge, lane change) that the autonomous platform 110 makes. The strategy may be selected from a plurality of potential strategies. The selected strategy may be a lowest cost strategy as determined by one or more cost functions. The cost functions may, for example, evaluate the probability of a collision with another actor or object.

The planning system 250 may determine a desired trajectory for executing a strategy. For instance, the planning system 250 may obtain one or more trajectories for executing one or more strategies. The planning system 250 may evaluate trajectories or strategies (e.g., with scores, costs, rewards, constraints, etc.) and rank them. For instance, the planning system 250 may use forecasting output(s) that indicate interactions (e.g., proximity, intersections, etc.) between trajectories for the autonomous platform 110 and one or more objects to inform the evaluation of candidate trajectories or strategies for the autonomous platform 110. In some implementations, the planning system 250 may utilize static cost(s) to evaluate trajectories for the autonomous platform 110 (e.g., "avoid lane boundaries," "minimize jerk," etc.). Additionally, or alternatively, the planning system 250 may utilize dynamic cost(s) to evaluate the trajectories or strategies for the autonomous platform 110 based on forecasted outcomes for the current operational scenario (e.g., forecasted trajectories or strategies leading to interactions between actors, forecasted trajectories or strategies leading to interactions between actors and the autonomous platform 110, etc.). The planning system 250 may rank trajectories based on one or more static costs, one or more dynamic costs, or a combination thereof. The planning system 250 may select a motion plan (and a corresponding trajectory) based on a ranking of a plurality of candidate trajectories. In some implementations, the planning system 250 may select a highest ranked candidate, or a highest ranked feasible candidate.

The planning system 250 may then validate the selected trajectory against one or more constraints before the trajectory is executed by the autonomous platform 110.

To help with its motion planning decisions, the planning system 250 may be configured to perform a forecasting function. The planning system 250 may forecast future state(s) of the environment. This may include forecasting the future state(s) of other actors in the environment. In some implementations, the planning system 250 may forecast future state(s) based on current or past state(s) (e.g., as developed or maintained by the perception system 240). In some implementations, future state(s) may be or include one or more forecasted trajectories (e.g., positions over time) of the objects in the environment, such as other actors. In some implementations, one or more of the future state(s) may include one or more probabilities associated therewith (e.g., marginal probabilities, conditional probabilities). For example, the one or more probabilities may include one or more probabilities conditioned on the strategy or trajectory options available to the autonomous platform 110. Additionally, or alternatively, the probabilities may include probabilities conditioned on trajectory options available to one or more other actors.

In some implementations, the planning system 250 may perform interactive forecasting. The planning system 250 may determine a motion plan for an autonomous platform 110 with an understanding of how forecasted future states of the environment 102 may be affected by execution of one or more candidate motion plans.

By way of example, with reference again to FIG. 1, the autonomous platform 110 may determine candidate motion plans corresponding to a set of platform trajectories 112A-C that respectively correspond to the first actor trajectories 122A-C for the first actor 120, trajectories 132 for the second actor 130, and trajectories 142 for the third actor 140 (e.g., with respective trajectory correspondence indicated with matching line styles). The autonomous platform 110 may evaluate each of the potential platform trajectories and predict its impact on the environment.

For example, the autonomous platform 110 (e.g., using its autonomy system 200) may determine that a platform trajectory 112A would move the autonomous platform 110 more quickly into the area in front of the first actor 120 and is likely to cause the first actor 120 to decrease its forward speed and yield more quickly to the autonomous platform 110 in accordance with a first actor trajectory 122A.

Additionally or alternatively, the autonomous platform 110 may determine that a platform trajectory 112B would move the autonomous platform 110 gently into the area in front of the first actor 120 and, thus, may cause the first actor 120 to slightly decrease its speed and yield slowly to the autonomous platform 110 in accordance with a first actor trajectory 122B.

Additionally or alternatively, the autonomous platform 110 may determine that a platform trajectory 112C would cause the autonomous vehicle to remain in a parallel alignment with the first actor 120 and, thus, the first actor 120 is unlikely to yield any distance to the autonomous platform 110 in accordance with first actor trajectory 122C.

Based on comparison of the forecasted scenarios to a set of desired outcomes (e.g., by scoring scenarios based on a cost or reward), the planning system 250 may select a motion plan (and its associated trajectory) in view of the interaction of the autonomous platform 110 with the environment 102. In this manner, for example, the autonomous platform 110 may achieve at least a technical improvement that interleaves its forecasting and motion planning functionality.

To implement selected motion plan(s), the autonomy system 200 may include a control system 260 (e.g., a vehicle control system). Generally, the control system 260 may provide an interface between the autonomy system 200 and the platform control devices 212 for implementing the strategies and motion plan(s) generated by the planning system 250. For instance, control system 260 may implement the selected motion plan/trajectory to control motion of the autonomous platform 110 through its environment by following the selected trajectory (e.g., the waypoints included therein). The control system 260 can, for example, translate a motion plan into instructions for the appropriate platform control devices 212 (e.g., acceleration control, brake control, steering control, etc.). By way of example, the control system 260 may translate a selected motion plan into instructions to adjust a steering component (e.g., a steering angle) by a certain number of degrees, apply a certain magnitude of braking force, increase/decrease speed, etc. In some implementations, the control system 260 may communicate with the platform control devices 212 through communication channels including, for example, one or more data buses (e.g., controller area network (CAN), etc.), onboard diagnostics connectors (e.g., OBD-II, etc.), or a combination of wired or wireless communication links. The platform control devices 212 may send or obtain data, messages, signals, etc. to or from the autonomy system 200 (or vice versa) through the communication channel(s).

The autonomy system 200 may receive, through communication interface(s) 206, assistive signal(s) from remote assistance system 270. Remote assistance system 270 may communicate with the autonomy system 200 over a network (e.g., as a remote system 160 over network 170). In some implementations, the autonomy system 200 may initiate a communication session with the remote assistance system 270. For example, the autonomy system 200 may initiate a session based on or in response to a trigger. In some implementations, the trigger may be an alert, an error signal, a map feature, a request, a location, a traffic condition, a road condition, etc.

After initiating the session, the autonomy system 200 may provide context data to the remote assistance system 270. The context data may include sensor data 204 and state data of the autonomous platform 110. For example, the context data may include a live camera feed from a camera of the autonomous platform 110 and the current speed of the autonomous platform 110. An operator (e.g., human operator) of the remote assistance system 270 may use the context data to select one or more assistive signals. The assistive signal(s) may provide values or adjustments for various operational parameters or characteristics for the autonomy system 200. For instance, the assistive signal(s) may include way points (e.g., a path around an obstacle, lane change, etc.), velocity or acceleration profiles (e.g., speed limits, etc.), relative motion instructions (e.g., convoy formation, etc.), operational characteristics (e.g., use of auxiliary systems, reduced energy processing modes, etc.), or other signals to assist the autonomy system 200.

Autonomy system 200 may use the assistive signal(s) for input into one or more autonomy subsystems for performing autonomy functions. For instance, the planning system 250 may receive the assistive signal(s) as an input for generating a motion plan. For example, assistive signal(s) may include constraints for generating a motion plan. Additionally, or alternatively, assistive signal(s) may include cost or reward adjustments for influencing motion planning by the planning system 250. Additionally, or alternatively, assistive signal(s) may be considered by the autonomy system 200 as suggestive inputs for consideration in addition to other received data (e.g., sensor inputs, etc.).

The autonomy system 200 may be platform agnostic, and the control system 260 may provide control instructions to platform control devices 212 for a variety of different platforms for autonomous movement (e.g., a plurality of different autonomous platforms fitted with autonomous control systems). This may include a variety of different types of autonomous vehicles (e.g., sedans, vans, SUVs, trucks, electric vehicles, combustion power vehicles, etc.) from a variety of different manufacturers/developers that operate in various different environments and, in some implementations, perform one or more vehicle services.

Figure 3A:
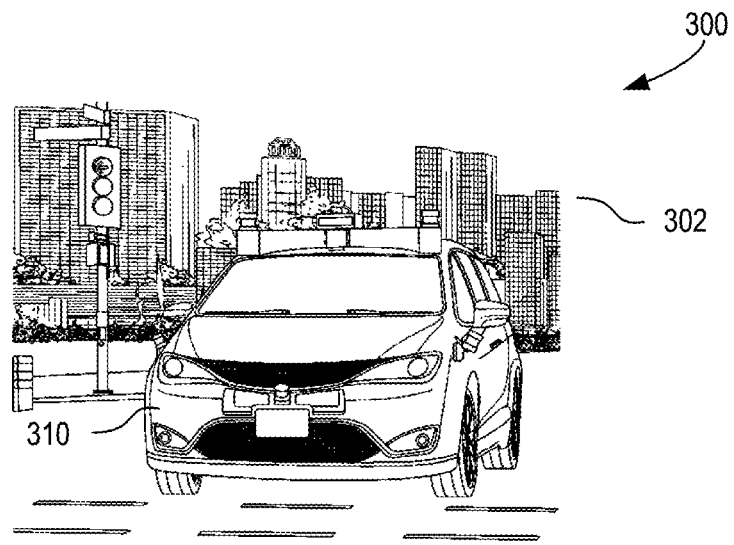
FIG. 3A is a representation of an example operational environment, according to some implementations of the present disclosure.

For example, with reference to FIG. 3A, an operational environment 300 may include a dense environment 302. An autonomous platform 110 may include an autonomous vehicle 310 controlled by the autonomy system 200. In some implementations, the autonomous vehicle 310 may be configured for maneuverability in a dense environment, such as with a configured wheelbase or other specifications. In some implementations, the autonomous vehicle 310 may be configured for transporting cargo or passengers. In some implementations, the autonomous vehicle 310 may be configured to transport numerous passengers (e.g., a passenger van, a shuttle, a bus, etc.). In some implementations, the autonomous vehicle 310 may be configured to transport cargo, such as large quantities of cargo (e.g., a truck, a box van, a step van, etc.) or smaller cargo (e.g., food, personal packages, etc.).

Figure 3B:
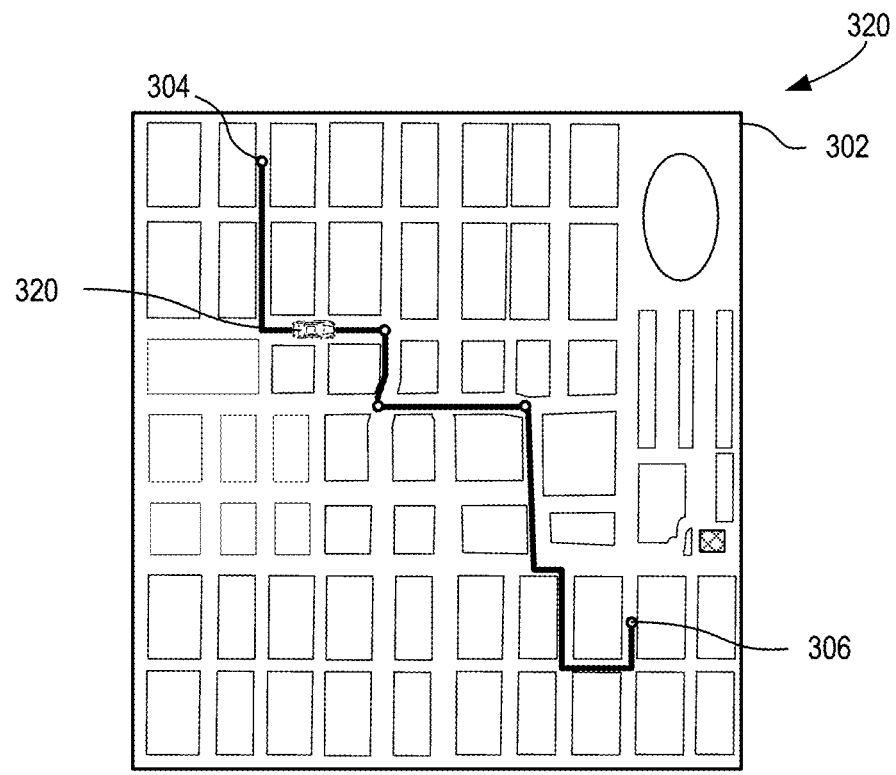
FIG. 3B is a representation of an example map of an operational environment, according to some implementations of the present disclosure.

With reference to FIG. 3B, a selected overhead view 320 of the dense environment 302 is shown overlaid with an example trip/service between a first location 304 and a second location 306. The example trip/service may be assigned, for example, to an autonomous vehicle 320 by a remote computing system. The autonomous vehicle 320 may be, for example, the same type of vehicle as autonomous vehicle 310. The example trip/service may include transporting passengers or cargo between the first location 304 and the second location 306. In some implementations, the example trip/service may include travel to or through one or more intermediate locations, such as to onload or offload passengers or cargo. In some implementations, the example trip/service may be prescheduled (e.g., for regular traversal, such as on a transportation schedule). In some implementations, the example trip/service may be on-demand (e.g., as requested by or for performing a taxi, rideshare, ride hailing, courier, delivery service, etc.).

Figure 3C:
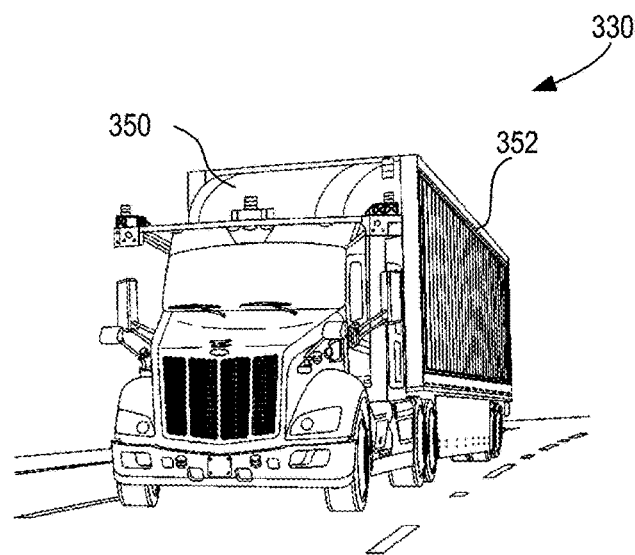
FIG. 3C is a representation of an example operational environment, according to some implementations of the present disclosure.

With reference to FIG. 3C, in another example, an operational environment may include an open travel way environment 330. An autonomous platform 110 may include an autonomous vehicle 350 controlled by the autonomy system 200. This may include an autonomous tractor for an autonomous truck. In some implementations, the autonomous vehicle 350 may be configured for high payload transport (e.g., transporting freight or other cargo or passengers in quantity), such as for long distance, high payload transport. For instance, the autonomous vehicle 350 may include one or more cargo platform attachments such as a trailer 352. Although depicted as a towed attachment in FIG. 3C, in some implementations one or more cargo platforms may be integrated into (e.g., attached to the chassis of, etc.) the autonomous vehicle 350 (e.g., as in a box van, step van, etc.).

Figure 3D:
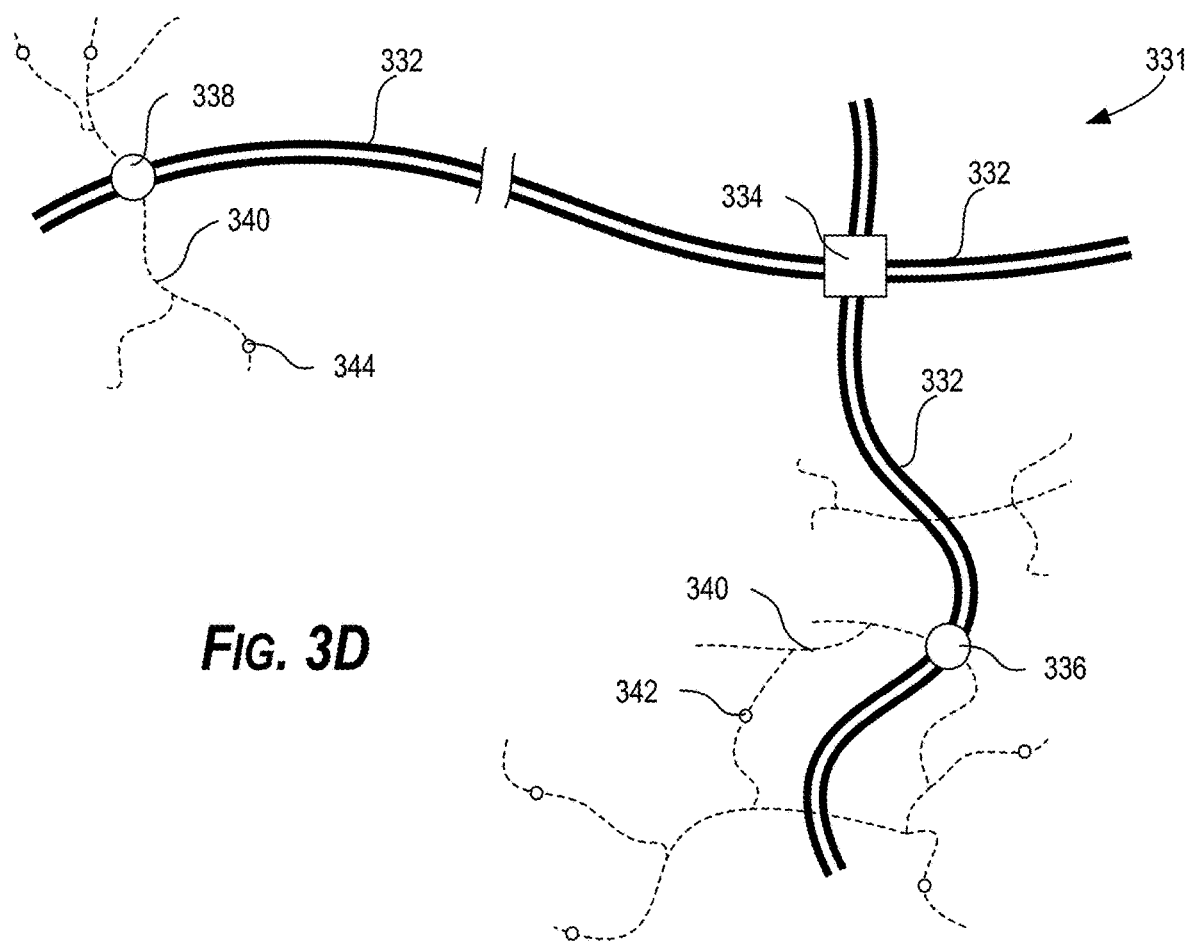
FIG. 3D is a representation of an example map of an operational environment, according to some implementations of the present disclosure.

With reference to FIG. 3D, a selected overhead view 331 of open travel way environment 330 is shown, including travel ways 332, an interchange 334, transfer hubs 336 and 338, access travel ways 340, and locations 342 and 344. In some implementations, an autonomous vehicle (e.g., the autonomous vehicle 310 or the autonomous vehicle 350) may be assigned an example trip/service to traverse the one or more travel ways 332 (optionally connected by the interchange 334) to transport cargo between the transfer hub 336 and the transfer hub 338. For instance, in some implementations, the example trip/service includes a cargo delivery/transport service, such as a freight delivery/transport service. The example trip/service may be assigned by a remote computing system. In some implementations, the transfer hub 336 may be an origin point for cargo (e.g., a depot, a warehouse, a facility, etc.) and the transfer hub 338 may be a destination point for cargo (e.g., a retailer, etc.). However, in some implementations, the transfer hub 336 may be an intermediate point along a cargo item's ultimate journey between its respective origin and its respective destination. For instance, a cargo item's origin may be situated along the access travel ways 340 at the location 342. The cargo item may accordingly be transported to transfer hub 336 (e.g., by a human-driven vehicle, by the autonomous vehicle 310, etc.) for staging. At the transfer hub 336, various cargo items may be grouped or staged for longer distance transport over the travel ways 332.

In some implementations of an example trip/service, a group of staged cargo items may be loaded onto an autonomous vehicle (e.g., the autonomous vehicle 350) for transport to one or more other transfer hubs, such as the transfer hub 338. For instance, although not depicted, it is to be understood that the open travel way environment 330 may include more transfer hubs than the transfer hubs 336 and 338 and may include more travel ways 332 interconnected by more interchanges 334. A simplified map is presented here for purposes of clarity only. In some implementations, one or more cargo items transported to the transfer hub 338 may be distributed to one or more local destinations (e.g., by a human-driven vehicle, by the autonomous vehicle 310, etc.), such as along the access travel ways 340 to the location 344. In some implementations, the example trip/service may be prescheduled (e.g., for regular traversal, such as on a transportation schedule). In some implementations, the example trip/service may be on-demand (e.g., as requested by or for performing a chartered passenger transport or freight delivery service).

To improve the operation of autonomous platforms, such as an autonomous vehicle (e.g., autonomous platform 110) controlled at least in part using autonomy system 200 (e.g., the autonomous vehicles 310 or 350), example aspects of the present disclosure provide improved motion planning systems and techniques.

Figure 4:
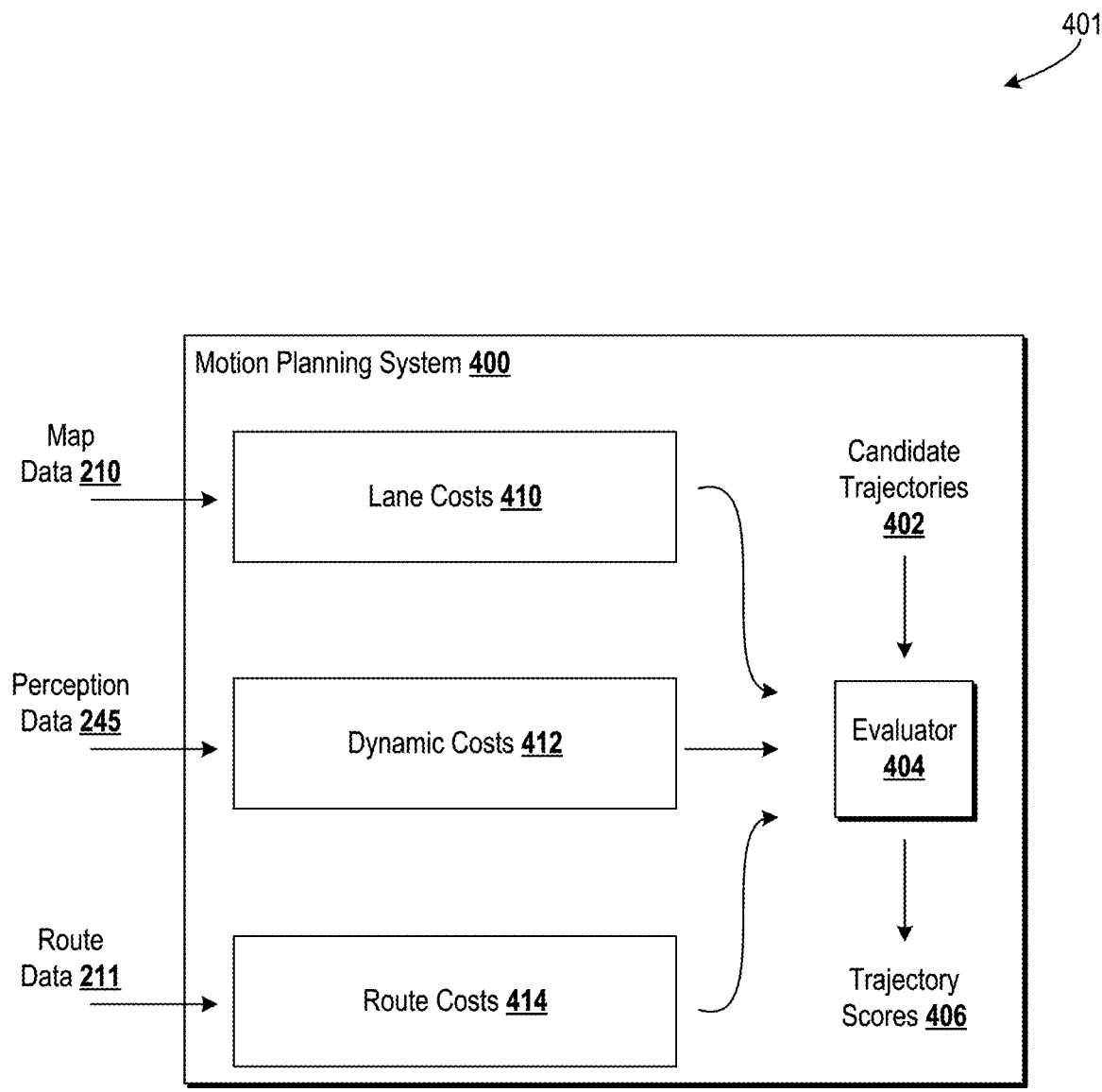
FIG. 4 is a block diagram of an example motion planning system, according to some implementations of the present disclosure.

FIG. 4 is a block diagram 401 of an example motion planning system 400 according to example implementations of the present disclosure. Motion planning system 400 may be an example implementation of planning system 250. Motion planning system 400 may operate by obtaining one or more candidate trajectories 402 and evaluating one or more candidate trajectories 402 using evaluator 404. Evaluator 404 may output trajectory scores 406 for candidate trajectories 402. Motion planning system 400 may use the trajectory scores 406 to select a trajectory for execution from among the candidate trajectories 402. For instance, motion planning system 400 may rank candidate trajectories 402 and select a top-ranked trajectory for execution.

Evaluator 404 may use various different costs to evaluate a trajectory. For instance, motion planning system 400 may compute one or more lane costs 410 using map data 210. Lane costs 410 may quantify how well the autonomous vehicle is tracking within its lane. Motion planning system 400 may compute one or more dynamic costs 412 using perception data 245. Dynamic costs 412 may quantify how well the autonomous vehicle is avoiding other objects in the environment. Motion planning system 400 may compute one or more route costs 414 using route data 211. Route costs 414 may quantify how well the trajectory helps the autonomous vehicle achieve its routing goals. For instance, if the vehicle needs to exit a highway in order to remain on route, a route cost could penalize being located in a lane that does not access the off-ramp. Evaluator 404 may use each respective cost individually or in aggregate to generate a score for a trajectory.

Motion planning system 400 may include processing logic configured to receive a candidate trajectory and compute a cost for the candidate trajectory. Motion planning system 400 may compute the cost by executing a cost function at one or more points of a trajectory (e.g., using a point of the trajectory as an input). Motion planning system 400 may compute the cost by, for one or more points of the trajectory, using a coordinate value (spatial or temporal coordinate) for the point to retrieve a pre-computed cost value using a data structure. The data structure may be populated prior to, in parallel with, or otherwise at least partially independently from obtaining candidate trajectories 402.

Motion planning system 400 may include one or more linear or non-linear cost models. For instance, a cost model may provide a mapping between an input location (or an input trajectory) and a cost value based on a given set of context data (e.g., environment context, such as map context, perceived context, route context, etc.).

Motion planning system 400 may include one or more components trained using machine learning. For instance, motion planning system 400 may include a machine-learned model configured to receive a trajectory or point(s) thereof and return a predicted cost value. For instance, a machine-learned model may be configured to receive a trajectory or point(s) thereof and return a predicted lane cost value based on map data 210. For instance, a machine-learned model may be configured to receive a trajectory or point(s) thereof and return a predicted dynamic cost value based on perception data 245. For instance, a machine-learned model may be configured to receive a trajectory or point(s) thereof and return a predicted route cost value based on route data 211.

Candidate trajectories 402 may include one or more trajectories for evaluation. A trajectory may be represented as a data object describing positions of the autonomous vehicle over a series of time steps (e.g., future time steps). These positions may be represented as points in space associated with a time.

Evaluator 404 may include processing logic configured to use the computed cost(s) to determine an overall trajectory score. Evaluator 404 may obtain an aggregate cost function or surface and integrate or sum the aggregate cost of a particular trajectory over the trajectory's path. Evaluator 404 may obtain individual sums or aggregates over the trajectory for each component cost and aggregate the component costs afterward.

Trajectory scores 406 may be or include a value assigned to a candidate trajectory to indicate a relative or absolute goodness of the trajectory. The scores may be binary flags, discrete classification labels, or numerical values. The scores may be used to compare candidate trajectories to select a trajectory for execution by the vehicle. For instance, the scores may be used to rank candidate trajectories 402. The scores may be used to filter candidate trajectories 402. For example, candidate trajectories 402 may include scores above a threshold value and below a threshold value. A filter may be applied to candidate trajectories 402 to select the candidate trajectories 402 that have scores above a threshold value or select the candidate trajectories 402 that have scores below the threshold value.

Lane costs 410 may include one or more linear or nonlinear operators that ingest map data 210 to compute costs that score lane positions. Lane costs 410 may explicitly receive an input lane position (e.g., an input quantifying a lateral position within a roadway, a distance from a lane centerline, etc.) and output a cost value. Lane costs 410 may implicitly compute scores based on lane position, for example by receiving an input ego vehicle position defined without explicit reference to a lane boundary and processing the input ego vehicle position in view of map data 210. For example, motion planning system 400 may project the input ego vehicle position into the map data coordinate frame, combine the position and the map data, and process the combined position and map data to generate a lane cost for the position. For example, motion planning system 400 may project map data into an ego vehicle coordinate frame, combine the position and the map data, and process the combined position and map data to generate a lane cost for the position.

Lane costs 410 may correspond to physical boundaries in a roadway. Example physical boundaries may include a curb or a shoulder. Physical boundaries can include marked boundaries, such as painted lines, reflectors, cones, or other markers that delineate a boundary. Lane costs 410 may correspond to inferred boundaries. For instance, an inferred boundary may include an interpolated boundary between a first portion of a lane on one side of an intersection and a second portion of a lane on another side of an intersection. For example, some intersections may not contain marked boundaries within a central portion of the intersection. Inferred boundaries may be stored in map data or predicted using a model (e.g., a machine-learned model) at runtime.

In an example, a type of boundary may be used to adjust a cost associated with the boundary. For instance, a component cost of crossing a structural boundary (e.g., curb or wall) may be higher than a component cost of crossing a marker boundary (e.g., a line or cone) which may be higher than a component cost of crossing an inferred boundary. Such components may be composited with other component costs associated with other attributes of the boundary, such as whether the boundary borders oncoming traffic, whether these is a bicycle lane adjacent to the boundary, whether there is a pedestrian walkway adjacent to the boundary, or other factors.

Lane costs 410 may cost a particular lane position based on a predetermined lane cost profile. For instance, a lane cost profile may be a one, two, three, or more-dimensional surface. In an example, a lane cost profile is a two-dimensional surface (e.g., curve), wherein one dimension corresponds to cost (e.g., a primitive thereof) and one dimension corresponds to lane position. The lane cost profile may span one or multiple lanes.

The lane cost profile may include a predetermined or pre-configured shape for a given lane configuration. For instance, an example lane cost profile may be pre-configured with a parameterized curve that is parameterized in terms of lane dimensions, such that the same example lane cost profile may be applied to various different lane configurations while adapting to the size of each lane. A lane cost profile may be retrieved from a database for a particular position in a particular roadway. For instance, map data 210 may include one or more predetermined lane cost profiles, and motion planning system 400 may retrieve relevant profiles for a given position along a mapped roadway.

The lane cost profile may be generated dynamically using one or more machine-learned models. For instance, a lane cost profile generation model may receive inputs describing map data 210 and output a lane cost profile for a given position on a roadway in the environment. This lane cost profile may then be used to evaluate a cost of different lane positions in the roadway. Generating a lane cost profile may include rendering a raster bitmap of a lane cost profile, generating a vector-based representation of a lane cost profile, generating a series of points characterizing the lane cost profile (e.g., by computing costs for a sampled distribution of points across a roadway), predicting a parameter for characterizing a parameterized lane cost profile, or any combination thereof.

An example lane cost profile for a multilane roadway may be continuous and nonconvex. For instance, a lane cost profile for a multilane roadway may include multiple basins of cost (e.g., regions in the profile in which cost decreases toward a local minimum). The cost values at adjoining lane boundaries may be defined and surmountable. For instance, the cost values at adjoining lane boundaries may be finite. For example, the lane cost profile may be continuous across multiple basins. In this manner, for instance, motion planning system 400 may organically compare trajectories that cross lane boundaries against trajectories that do not cross lane boundaries.

Although example implementations are described herein with respect to a multilane "roadway," it is to be understood that the techniques described herein may be applied to subdivided travel ways more generally.

The lane cost profile may be obtained or generated as a whole or in parts. All basins may be obtained collectively (e.g., a profile across all lanes may be generated). Each basin may be obtained individually (e.g., a basin for each lane may be generated and joined to form the lane cost profile).

An example lane cost profile may be registered to the locations of lane features. For instance, the lane cost profile may be registered to lane centerlines. For example, a given basin for a given lane may be registered to (e.g., aligned with) a lane centerline. The registration may include aligning a basin centerline of the lane cost profile to the lane centerline. The registration may include determining an offset between the basin centerline and the lane centerline.

The height of the lane cost profile between basins may be tuned to balance a lane-change frequency with minimizing non-lane costs. For instance, increasing a height of the profile may increase a cost of a trajectory that crosses the lane boundary. As such, a lane change trajectory may need to reflect a greater decrease in a non-lane cost in another aspect as compared to a non-lane change trajectory in order to have an overall lower trajectory cost. For example, an overall lower trajectory cost may correspond to a cost-benefit balance: a benefit of reduced congestion, or easier access to an offramp as a result of changing lanes would need to be higher than a cost associated with the lane change. Example non-lane costs include dynamic costs 412 and route costs 414. Therefore, increasing a height of the profile may reduce a lane change frequency by avoiding lane changes that achieve only marginal gains in non-lane costs. In turn, decreasing the height of the profile may decrease a cost of a trajectory that crosses a lane boundary. As compared to the increased-height scenario above, a lane change trajectory may not require as much of a decrease in a non-lane cost to have an overall lower trajectory cost. Therefore, reducing a height of the profile may increase a lane change frequency by actively changing lanes for small gains in non-lane costs.

Lane change proclivity may be tuned using real-world training data that describes lane-change behavior of real world drivers. For instance, real-world driving patterns may be characterized by a lane momentum or stickiness, such that a vehicle may stay in its lane unless there is sufficient advantage to induce a change in lane. Accordingly, one or more parameters of a lane cost profile (e.g., a parameter that controls height) may be regressed or otherwise obtained to cause a behavior of motion planning system 400 to align with lane-change behavior of real world drivers.

The shape of the lane cost profile within each basin may be tuned to control lane-centering behavior. For instance, a basin with steep walls and a relatively gentle slope reversal at the bottom (e.g., a "U" shape) may have a relatively soft lane-centering effect, as moving to different positions within the bottom of the basin (between the steep walls) may be associated with relatively small changes in cost. In contrast, a basin with a more abrupt slope reversal (e.g., a "V" shape) may have a stronger lane-centering effect, as the costs away from the centerline may increase more rapidly. In general, for a given region surrounding a basin's minimum, a higher mean or median slope magnitude may correspond to stronger lane centering behavior within that region.

Similarly, a location of the minimum within the basin may be shifted to bias the vehicle to one side or another. For instance, an asymmetric basin may include a minimum that is skewed more toward one side. This shape may bias motion planning system 400 toward trajectories that remain slightly toward that one side within the lane.

The slope of the walls of the basin may be asymmetric. For instance, movement within a lane may be less desirable based on what is near the lane. For example, movement within a lane toward a structure (e.g., a wall) may be evaluated differently than movement within a lane toward a lane of opposing traffic, which may in turn be evaluated differently than movement within a lane toward a lane of same-direction traffic. The slope of a basin wall may be selected based on the environmental context associated with that wall of the basin to adjust a penalty of motion within the lane in that direction.

The lane cost profile may contain identical basins, or the basins may vary across lanes. For instance, the lane cost profile may use different basins for internal lanes (e.g., lanes that are bounded by other lanes moving in the same direction) as compared to boundary lanes (e.g., lanes bounded by a wall, a shoulder, a lane centerline, etc.). In an example, a lane cost profile may use the same basin for all internal lanes. In an example, a lane cost profile may use the same basins for all internal lanes and the lane bounding a roadway edge or shoulder and use a different basin for a lane bordering oncoming traffic.

Aspects of lane costs 410 may be dynamic based on a current environment (e.g., based on perception data 245). For example, an online mapping component of autonomy system 200 may generate updates to map data 210 based on perception data 245. For example, adjustments to lane boundaries may be updated as needed in real time due to, for instance, repainting of a road, construction or other activities that redirect normal traffic flow, or other alternations of a stored or precomputed map for a current environment. These deviations may be detected by perception system 240 and pushed to map data 210 so that map data 210 reflects a current understanding of a map of the current environment.

Dynamic costs 412 may include one or more linear or nonlinear operators that ingest perception data 245 and generate cost values associated with objects in the environment. Dynamic costs 412 may quantify how well the autonomous vehicle is avoiding other objects in the environment. For instance, dynamic costs 412 may increase a cost of locations near to objects in the environment.

Route costs 414 may include one or more linear or nonlinear operators that ingest route data 211 and generate cost values that quantify how well the trajectory helps the autonomous vehicle achieve its routing goals. For instance, if the vehicle needs to exit a highway in order to remain on route, a route cost could penalize being located in a lane that does not access the off-ramp. Route costs 414 may be applied on a per-lane basis. For instance, route costs 414 may not change for positions across a lane, such that the same route cost may apply for a given longitudinal position in a lane.

Route costs 414 may be determined based on a navigation action associated with route data 211. For example, a navigation action may include a turn from one roadway to a next or a turn off a roadway. The navigation action may be beyond the current planning horizon. For instance, a planning horizon may be less than about 5 seconds, but a navigation action may be upcoming in 30 seconds. Nevertheless, maneuvers performed during the planning horizon may affect the navigation action. For instance, changing lanes early may secure a position in an exit lane, while waiting to change lanes may allow for traffic to fill the exit lane, preventing the lane change at a later time.

Route costs 414 may be determined based on a cost to execute the navigation action. For instance, a cost to execute may include a metric of navigation difficulty. For instance, a cost to execute a right turn may be higher if the ego vehicle is in a far left lane of a multilane roadway than if the ego vehicle is in the middle or right lanes. In such a situation, the cost may be computed based on the number of lanes, traffic density, etc.

Route costs 414 may be determined based on a cost of not executing the navigation action. For instance, missing an exit on a highway may be of little or of great consequence. For instance, if exits are few and far between, missing an exit could result in significant delays to the mission, excess fuel burned or energy otherwise expended. A cost of not executing the exit navigation action may be high. In contrast, if there are multiple routes to a destination, and a particular navigation action provides a branching point between similarly-situated routes, then a cost of not executing the navigation action may be low. A cost may be computed using a metric based on time delay, energy cost to travel, number of alternate routes, mapping coverage, or any combination thereof.

Route costs 414 may be inversely proportional to a distance to a navigational action used to compute the route cost. For instance, a full value of route costs 414 (e.g., a cost of missing a turn) may be discounted over a distance from the evaluation position to a location at which the navigational action is to be performed (e.g., the location of the turn, the exit, intersection, etc.). In this manner, for instance, adjusting a cost associated with a navigational action may adjust the effective planning horizon at which that navigational action begins to impact planning decisions. The effective planning horizon for such navigational actions may be longer than (e.g., 2×, 5×, 10×, 100×) a motion planning horizon for a motion planning trajectory. For instance, an effective planning horizon at which navigational actions may be furthered or otherwise affected by motion planning decisions may be on the order of 10 seconds, 30 seconds, 1 minute, 10 minutes, 30 minutes, etc., whereas trajectories may only be generated up to a 2 second horizon, a 5 second horizon, etc.

Motion planning system 400 may compute lane costs 410, dynamic costs 412, and route costs 414 at least partially in parallel. For instance, lane costs 410, dynamic costs 412, and route costs 414 may be independent, such that the computation of each may be performed without awaiting completion of the others.

Figure 5:
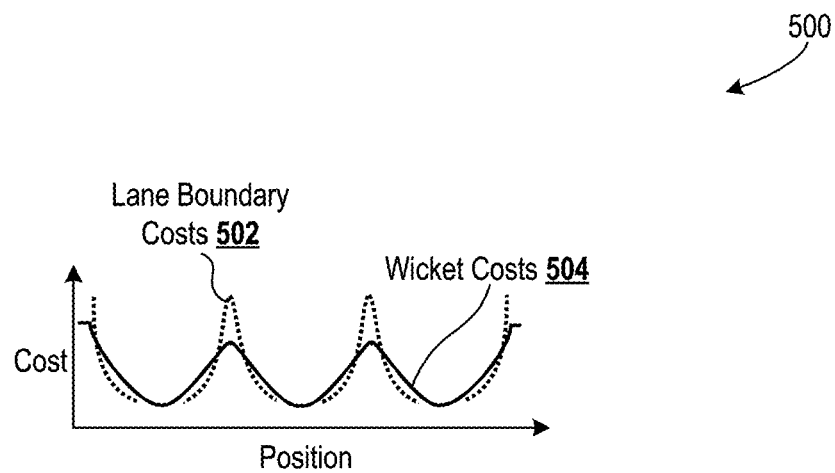
FIG. 5 is an example chart of lane cost profile components, according to some implementations of the present disclosure.

FIG. 5 is a chart 500 illustrating an example lane cost profile that maps a position to a cost. A lane cost profile may include one or multiple subcomponents. A lane cost profile may include lane boundary costs 502 and wicket costs 504.

Lane boundary costs 502 may include a profile region that maps locations near a lane boundary to cost values. Lane boundary costs 502 may be continuous across lane boundaries. Lane boundary costs 502 may form smooth basins or may drop to zero in between boundaries.

Lane boundary costs 502 may be composed from half-lane profiles that are joined to be continuous at the joint. For instance, each lane may have two associated half-lane profiles. Each half-lane profile may be selected (e.g., by a mapping system, by a motion planning system) based on an attribute of the lane boundary. For instance, a lane boundary against a wall may have a profile selected (e.g., by a mapping system, by a motion planning system) for that context. A lane boundary against opposing traffic may have a profile selected (e.g., by a mapping system, by a motion planning system) for that context. A lane boundary against a same-direction lane may have a profile selected (e.g., by a mapping system, by a motion planning system) for that context. A lane boundary against a shoulder may have a profile selected (e.g., by a mapping system, by a motion planning system) for that context.

Wicket costs 504 may include other lane-related cost values. Wicket costs 504 may include lane-centering costs. Wicket costs 504 may include route costs 414. Wicket costs 504 may be formed of smooth basins. The basins may be the same depth or different depths. For instance, if one lane is preferred (e.g., has a lower route cost 414), its basin may be deeper. Wicket costs 504 may include a constant cost outside of a set of designated lanes.

Wicket costs 504 may be computed for individual wickets. A wicket may be a selected longitudinal position in a roadway.

Figure 6:
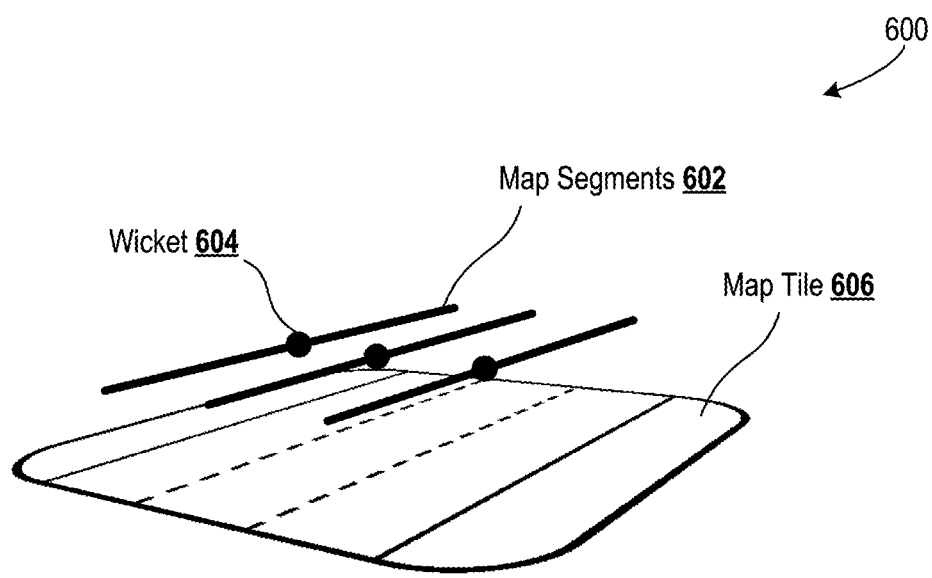
FIG. 6 is an illustration of a map data structure, according to some implementations of the present disclosure.

FIG. 6 is an illustration 600 of a plurality of map segments 602 each having corresponding wickets 604 disposed thereon. A graphical map tile 606 is illustrated for clarity A map segment 602 may include an edge in a graph or a curve associated with lanes of a particular roadway mapped in map data 210. Map data 210 may include many different data types stored at different levels of granularity. In an example, map data 210 stores a lane of a roadway as a curve. The curve may be represented using a continuous function (e.g., so that locations on the curve may be computed with arbitrary precision) or using discrete representations (e.g., so that locations on the curve may be selected from discrete points, or by interpolation between discrete points). A wicket may be a position on the curve.

In an example, map data 210 stores a roadway as a graph. The wickets may form nodes on the graph. The nodes may store information associated with the wickets (e.g., lane information, speed limit information, road surface information, etc.). Edges of the graph may indicate connections between wickets.

Wicket 604 may be a point sampled from map segment 602. For instance, map segment 602 may indicate multiple possible locations. For instance, map segment 602 may be a continuous function in space or a discrete set of points. Wicket 604 may be a point selected from the possible locations. Wicket 604 may be sampled based on a desired spatial precision (e.g., distance between wickets), temporal precision (e.g., interval between wickets at current/expected speed), etc.

Wicket 604 may be a data object indexed from map segment 602. For instance, map segment 602 may be a data structure that contains multiple wickets along a roadway, each wicket storing information associated with that position along the roadway. Map segment 602 may be indexed to retrieve wicket 604.

In an example, each basin of the lane cost profile corresponds to a wicket.

Map tile 606 may correspond to an excerpted portion of map data 210 that indicates a position of lane boundaries, roadway extents, etc.

Figure 7:
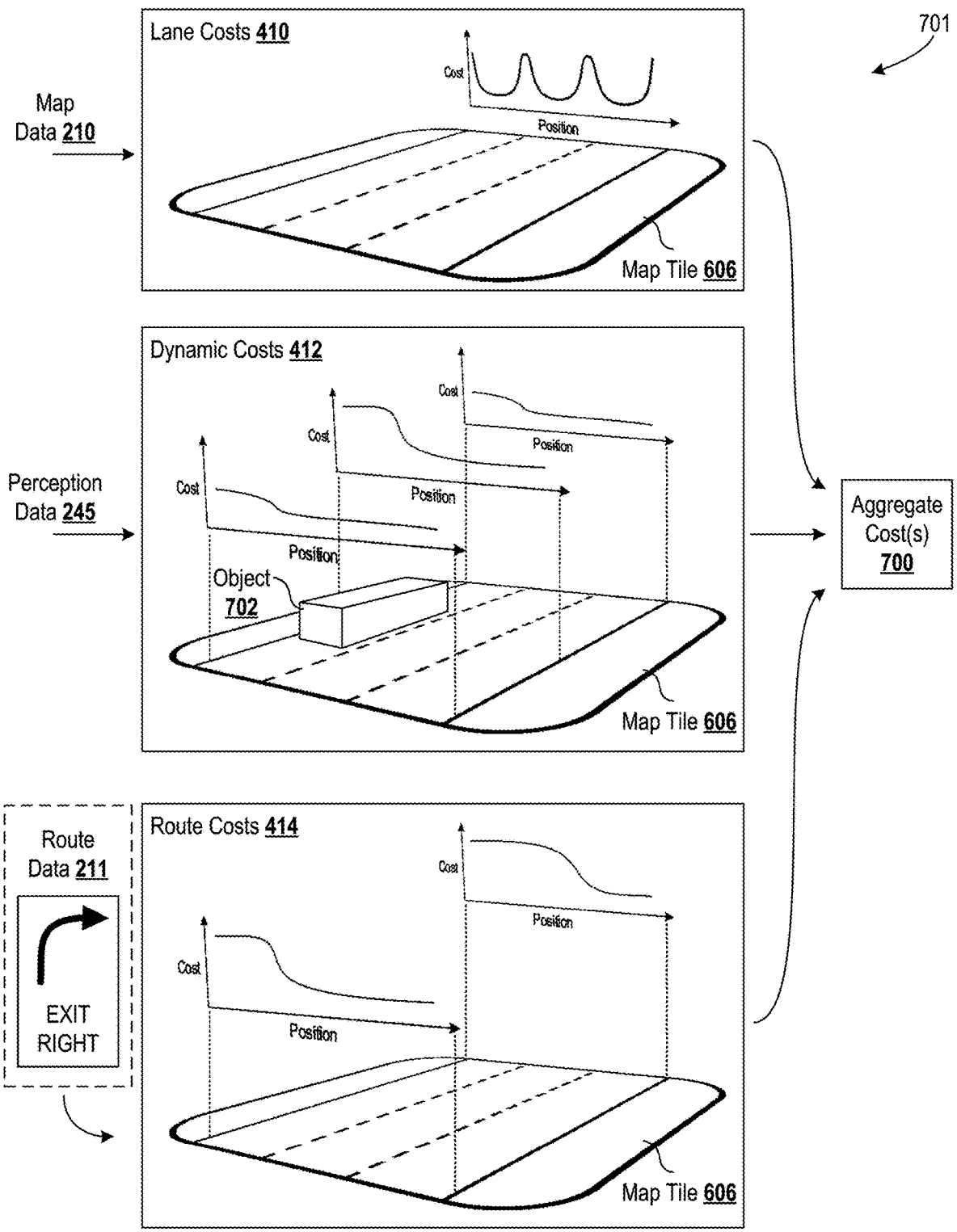
FIG. 7 is an illustration of a costing structure, according to some implementations of the present disclosure.

FIG. 7 is a block diagram 701 illustrating the aggregation of costs in various dimensions. Aggregate cost(s) 700 may be computed for a particular location based on lane costs 410, dynamic costs 412, and route costs 414.

In an example, lane costs 410 may vary laterally and longitudinally. However, lane costs 410 may be the same for a given length of roadway. For instance, a lane cost profile (e.g., a lane boundary cost 502) may be constant longitudinally across wickets with similarly-situated lanes (e.g., lanes with at least one or more same attributes, such as a context of an adjoining lane or boundary). For example, map tile 606 may contain a roadway with straight lanes over which the boundary costs may not change. A lane cost profile for each wicket sampled along map tile 606 may be the same.

As illustrated in FIG. 7, wickets in map tile 606 may have the same lane attributes. The same lane boundary profile may be computed for each wicket, or wickets may inherit or otherwise obtain the same lane boundary profile based on a matching of lane attributes.

In an example, dynamic costs 412 may vary laterally and longitudinally. For instance, an object 702 may occupy (and be projected to occupy) a certain region of space. Costs associated with that region may be higher. For instance, a dynamic cost profile may be viewed in slices across a longitudinal dimension of the roadway. For example, at a slice behind the object, the cost may be slightly increased near the object due to an increased rear burden on the object, a stopping distance or buffer criterion for the ego vehicle, etc. At a slice at the object position, the cost near the object may be much higher. At a slice in front of the object, the cost may again slightly increase near the object due to increased burden on the object (e.g., due to the object's stopping distance, buffer, etc.).

In an example, route costs 414 may vary laterally and longitudinally. For instance, a navigation action may include a maneuver to exit right off a highway. At a position far from the exit, a route cost may be about the same for all lanes (not shown). At a position nearer to the exit (the first slice shown here), the leftmost lane may be penalized due to the risk of not being able to cross three lanes at a later point. At a position still nearer to the exit, the leftmost lane and the middle lane may be penalized to encourage trajectories that move the vehicle to the right lane to be ready to exit.

Route costs 414 are illustrated here as smooth profiles, but it is to be understood that route costs 414 may be discrete steps or levels associated with each lane. For instance, an example route costs may be computed on a per-lane basis, such that the route cost profile may correspond to step changes at lane boundaries with constant values therebetween. For instance, computing a route cost (for a given longitudinal position) may include computing a single value for each lane, and then mapping all lateral positions in each lane to the designated route cost value for that lane. For instance, motion planning system 400 may interpolate between values using linear interpolation. For instance, linear interpolation may include fitting a linear function to two adjacent datapoints and executing the function on an intermediate value between the two adjacent datapoints. Other forms of interpolation may be used, including interpolation methods using splines (e.g., cubic splines) or other higher-order piecewise functions. Using a fuzzy match may improve real-world driving by allowing a motion planning system to use coarsely computed costs to score more fine-grained trajectories, thereby improving a computational efficiency of the motion planning system.

Costs may be aggregated (e.g., by evaluator 404) in various different ways. All costs may be converted to a common reference frame and added together to obtain a global cost surface, volume, or other multidimensional tensor. For instance, costs that only vary in one dimension (e.g., only laterally, only longitudinally), may be broadcast across the non-varying dimensions to obtain a three or four-dimensional cost tensor that may be added with other cost tensors that are natively three or four-dimensional.

Costs may be aggregated (e.g., by evaluator 404) on a per-point basis. For instance, given a query point (e.g., a point of a trajectory or other point), a lane cost may be computed, a dynamic cost may be computed, and a route cost may be computed. Each cost may be aggregated for that point to obtain an overall cost for that point.

Costs may be aggregated (e.g., by evaluator 404) on a per-trajectory basis. For instance, given a query trajectory, lane costs may be accumulated over the trajectory, dynamic costs may be accumulated over the trajectory, and route costs may be accumulated over the trajectory. Each component accumulation may be combined to obtain an overall cost.

Costs may be aggregated (e.g., by evaluator 404) on a per-region basis. For instance, given a region of space (e.g., a portion of an environment, such as map tile 606), lane costs may be computed over the region, dynamic costs may be computed over the region, and route costs may be computed over the region. The respective costs may be added in layers (e.g., by evaluator 404) to obtain an aggregate cost profile (e.g., an overall cost tensor) that indicates a cost for each location in the region.

Figure 8:
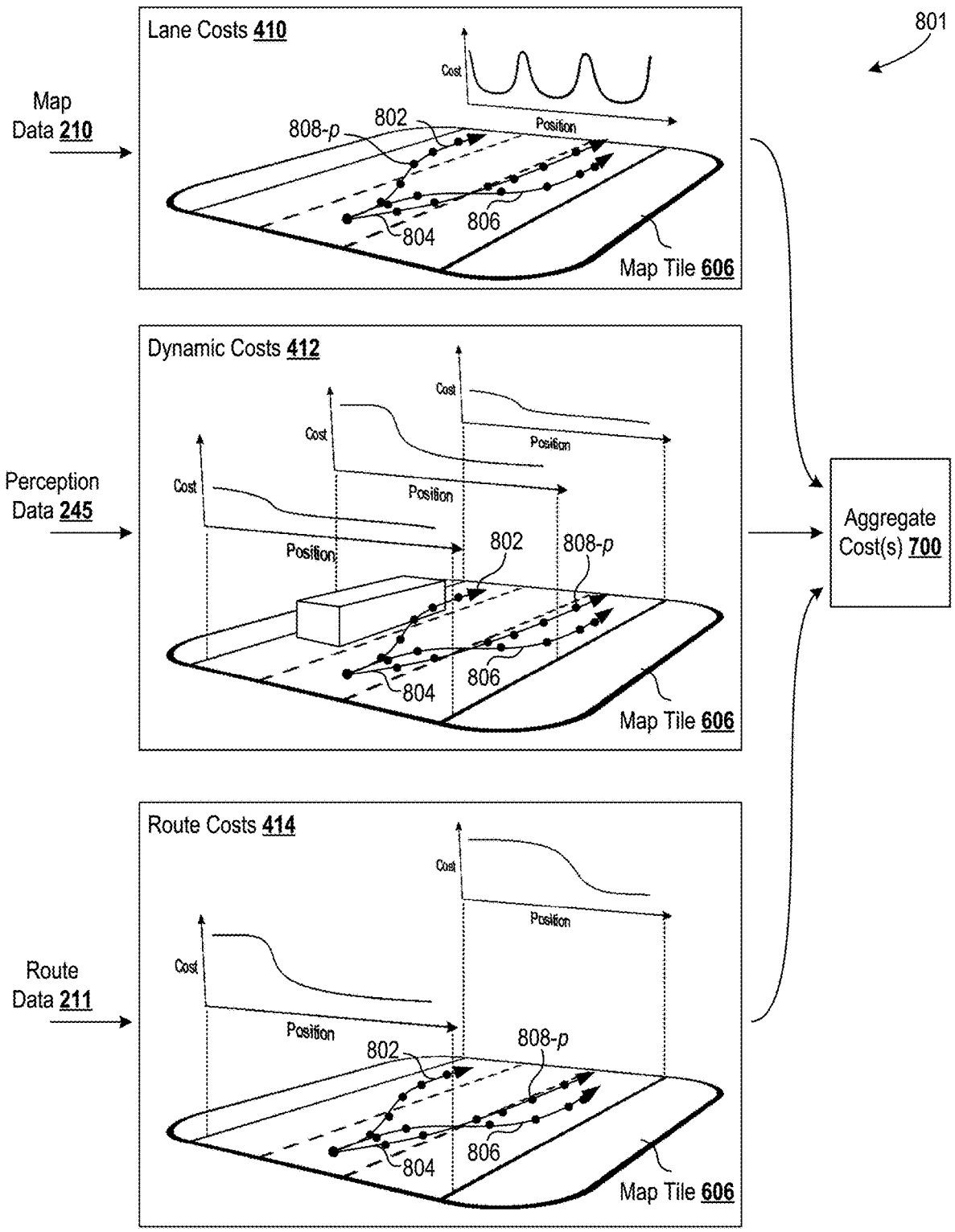
FIG. 8 is an illustration of a costing structure, according to some implementations of the present disclosure.

FIG. 8 is a block diagram 801 illustrating the use of trajectory points to query the costs. For instance, three candidate trajectories 802, 804, and 806 may each contain a number of trajectory points 808-$p$. Motion planning system 400 may use points 808-$p$ to query the costs for cost values at those points. For instance, point 808-$p$ may be provided as an input to a cost function to compute an output value that indicates the cost at that point. In an example, the cost functions may compute the cost in real time responsive to input of point 808-$p$. In an example, point 808-$p$ may be used to identify a representative point in a domain of pre-computed cost values to retrieve the corresponding pre-computed cost value or interpolate between pre-computed cost values.

Figure 9:
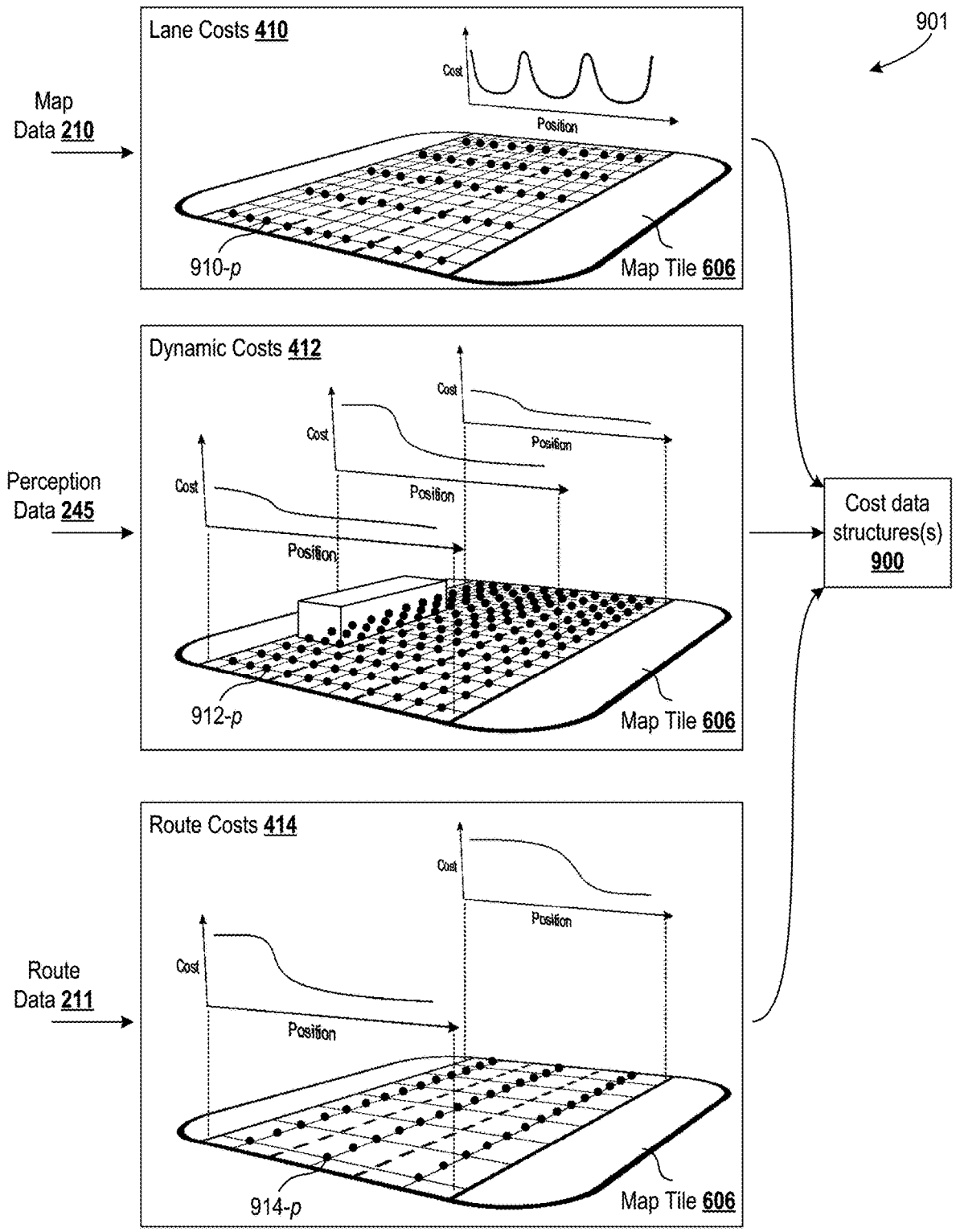
FIG. 9 is an illustration of a costing structure, according to some implementations of the present disclosure.

FIG. 9 is a block diagram illustrating 901 pre-computation of costs over discretized domain(s) to obtain one or more cost data structures 900. For each cost, a domain of points may be used to query the cost operators to obtain cost values for the point locations. The returned cost values may be stored and retrieved at trajectory evaluation time using a trajectory point to query the cost values. In this manner, for instance, cost tensors may be computed prior to or in parallel with the generation of candidate trajectories 402, since the cost values need not be dependent on the trajectories themselves.

Cost data structure(s) 900 may be a data structure used to map input values to output values efficiently. A data structure may be a precomputed table that stores the results of specific computations, allowing for quick retrieval of data without the need for recalculating. A query value may be used as an index or key to access the corresponding output value stored in the data structure. In an example, a query value may include a location at a particular time (e.g., a three or four-dimensional coordinate). The input value may be modified to match the indices available in the table (e.g., rounded, discretized, mapped to a cluster centroid, etc.). The output value may then be retrieved directly from the table without re-executing the underlying function to obtain the value.

Cost data structure(s) 900 may be populated by precomputing the function(s) over a desired domain. The domain may include locations over time. At trajectory evaluation time, the data structure may be queried using a point along a candidate trajectory. The point may not exactly match a domain value used to index the data structure. In an example, a closest index in the data structure may be found, and the cost value associated with the closest index may be returned. In an example, a cost value may be obtained by interpolating between values of nearby indices.

Interpolations or other approximations may be performed on the fly or may be pre-computed. In an example, a given cost profile (or portion thereof) may be represented using an interpolation operator or a linear or polynomial regression or other analytical expression with parameters regressed to fit the precomputed data. In this manner, for instance, a motion planning system may use complex cost computations that are pre-computed for each planning cycle. A motion planning system may use a lightweight, closed-form expression to approximate cost values at arbitrary locations within a domain. A motion planning system may use, for instance, a spline or other piecewise operator fit to the numerical data.

Cost data structure(s) 900 may include multiple individual data structures, such as one data structure for each cost. Cost data structure(s) 900 may include a single overall data structure for an aggregate cost. In an example, an aggregate data structure may be compiled by accumulating cost values over a common domain. Costs that are computed more coarsely (e.g., over a sparser domain than the common domain) may be mapped to the common domain (e.g., closest match, using interpolation, etc.). A common domain may have a precision selected to match the most precise component data structure.

Cost data structure(s) 900 may be generated in parallel. For instance, a computing system may execute lane costs 410, dynamic costs 412, and route costs 414 in parallel over their respective domains to generate cost data structure(s) 900. A computing system may execute lane costs 410, dynamic costs 412, and route costs 414 in separate threads, on separate cores, etc.

Values within a data structure may be computed in parallel. For instance, a computing system may process each point in parallel along a batch dimension of an input tensor.

For instance, one or more cost functions may include an operator (e.g., linear or nonlinear operator) parallelized along a batch dimension. A batch size may be equal a number of points in a domain for the data structure.

The distribution of query points for each cost may be the same or different. In an example, the precision used for a respective cost may be specifically adapted based on an attribute of that cost. In this manner, for instance, using semantically meaningful decomposition of costs into component costs may provide for a context-aware technique for increasing a sparsity of cost computations.

For example, query points $910\text{-}p$ may be obtained to query lane costs $410$. In an example, some lane costs may be characterized by higher frequency variations in a lateral direction as compared to a longitudinal direction. As such, the lateral sampling precision may be greater than the longitudinal sampling precision, such that query points $910\text{-}p$ may be more densely arranged in the lateral direction than in the longitudinal direction.

For example, query points $912\text{-}p$ may be obtained to query dynamic costs $412$. In an example, dynamic cost values may be queried with uniform precision within an area of drivable space. In an example, dynamic cost values may be queried with greater density than lane costs $410$. For instance, lane cost values may be queried on a per-wicket basis (e.g., a slice of a lane cost surface computed for the lane at the wicket location), and dynamic cost values may be queried between wickets. For example, objects in the environment may have attributes that do not align with a wicket spacing.

For example, query points $914\text{-}p$ may be obtained to query route costs $414$. In an example, route costs may be constant for each lane at a given longitudinal position. For instance, a metric of how lane selection impacts navigation may not depend on location within a lane. As such, the longitudinal sampling precision may be greater than the lateral sampling precision, such that query points $914\text{-}p$ may be more densely arranged in the longitudinal direction than in the lateral direction.

In an example, precision of the domain of query points (for any cost) may decrease beyond a planning horizon. For example, precision may correspond to a density of points in at least one of the longitudinal direction or the lateral direction. For instance, motion plans or trajectories may be planned at a first level of precision within a normal planning horizon. Long-horizon trajectories may be a planning tool to help give longer-term context to a present planning decision. Long-horizon trajectories may be computed beyond the normal planning horizon and extending from a terminal point of a given candidate trajectory. Long-horizon trajectories may be composed of sparse locations (e.g., waypoints of the long-horizon trajectory may be distanced further apart in space or time than a standard-horizon trajectory). As such, long-horizon trajectories may be evaluated using sparse query points. For example, for regions of a domain (spatial or temporal) beyond a normal planning horizon, the cost values may be precomputed more sparsely. This sparse computation may provide the technical advantage of efficient computation of trajectories over longer distances.

Figure 10:
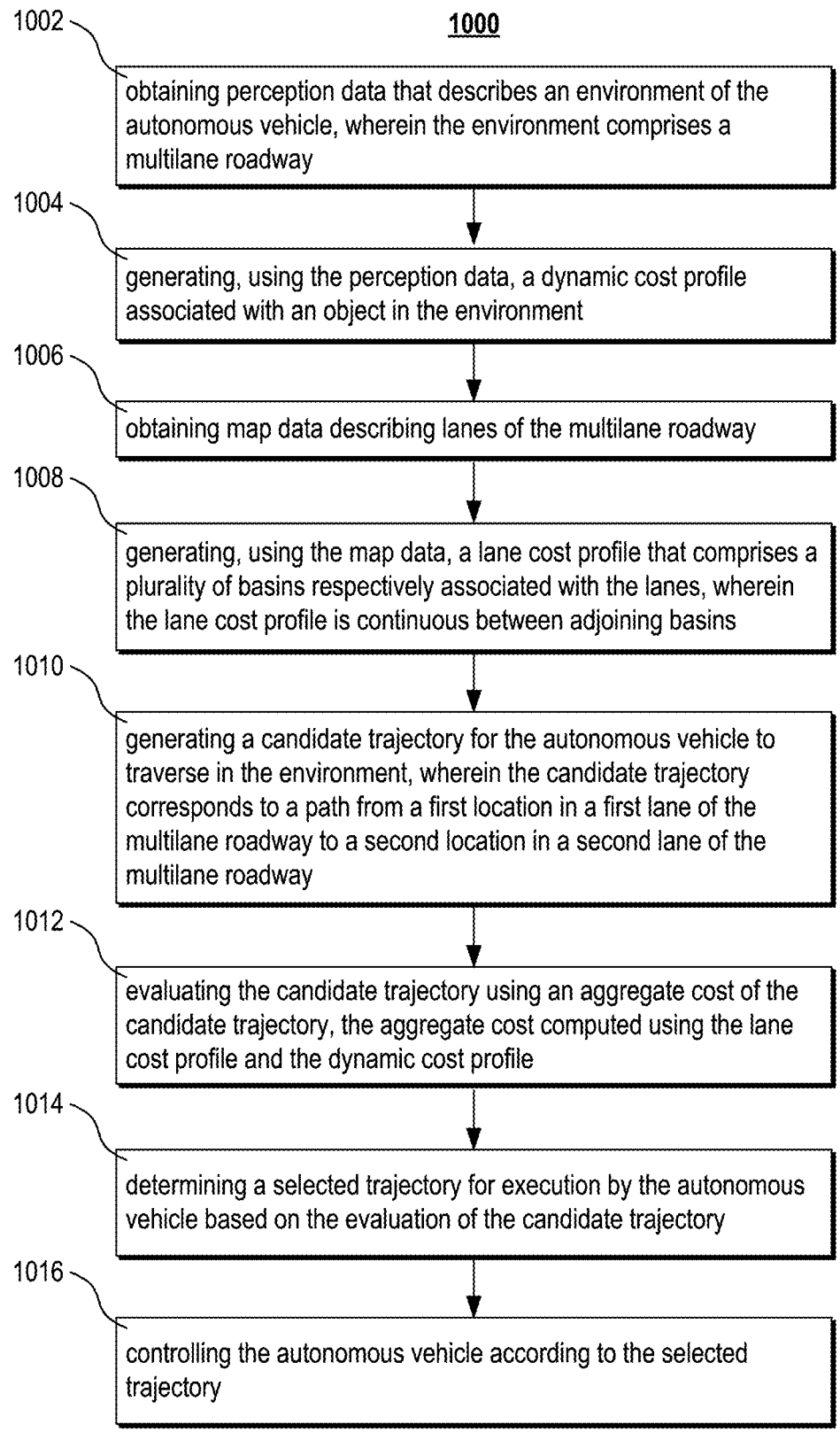
FIG. 10 is a flowchart of an example method for controlling an autonomous vehicle, according to some implementations of the present disclosure.

FIG. 10 is a flowchart of an example method 1000 for initiating an operational state change of an autonomous vehicle to cause the autonomous vehicle to launch a mission according to aspects of the present disclosure. One or more portions of example method 1000 may be implemented by the computing systems described with reference to the other figures (e.g., autonomous platform 110, onboard computing system 180, remote system 160, a system of FIGS. 1 to 12, etc.). Each respective portion of example method 1000 may be performed by any (or any combination) of one or more computing devices. Moreover, one or more portions of example method 1000 may be implemented on the hardware components of the devices described herein (e.g., as in FIGS. 1 to 12, etc.).

FIG. 10 depicts elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the present disclosure. FIG. 10 is described with reference to elements/terms described with respect to other systems and figures for exemplary illustrated purposes and is not meant to be limiting. One or more portions of example method 1000 may be performed additionally, or alternatively, by other systems.

At 1002, example method 1000 may include (a) obtaining perception data that describes an environment of the autonomous vehicle, wherein the environment includes a multilane roadway. For example, perception data (e.g., perception data 245) may include object detection and tracking data obtained from perception system 240.

At 1004, example method 1000 may include (b) generating, using the perception data, a dynamic cost profile associated with an object in the environment. For example, perception data 245 may include an indication of an object in the environment at a particular location. Motion planning system 400 may use perception data 245 to compute dynamic costs 412 to obtain cost values associated with the object, with higher cost values in locations coincident with or near the object. The cost values may form a cost profile that represents costs for respective locations in the environment. The cost values may be pre-computed to obtain a data structure or individual cost values may be computed on-demand for evaluating individual trajectories.

At 1006, example method 1000 may include (c) obtaining map data describing lanes of the multilane roadway. For example, map data 210 may include data describing a roadway. Map data 210 may include an indication of lanes that are available for travel. For instance, map data 210 may include path representations of available "streams" of travel, such that each lane is treated as a possible travel stream that may be entered and exited at various points. Map data 210 may describe, for a respective lane, data describing its position with respect to other lanes, lane dimensions, what environmental features border the lane, a type of boundary defining the lane (e.g., dotted line permitting crossing, solid white line, double yellow, etc.), and the like.

At 1008, example method 1000 may include (d) generating, using the map data, a lane cost profile that includes a plurality of basins respectively associated with the lanes, wherein the lane cost profile is continuous between adjoining basins. For example, motion planning system 400 may use lane costs 410 to obtain a lane cost profile for each lane based on one or more attributes of a lane. Motion planning system 400 may use lane costs 410 to obtain a lane cost profile for an entire roadway as a whole. In general, a lane cost profile may include lane cost values that vary across a lateral dimension of one or more lanes. To induce lane-centering behavior, the lane cost profile may include basins that increase a cost of diverging from a lane centerline (or other line-tracking target offset from the centerline). To help motion planning system 400 to organically evaluate lane-change trajectories against non-lane-change trajectories, a lane cost profile may be continuous between adjoining basins. Lane cost profiles may be smooth between adjoining basins. Lane cost profiles may be finite between adjoining basins. Motion planning system 400 may generate continuous and smooth profiles by computing discretized approximations thereof.

At 1010, example method 1000 may include (e) generating a candidate trajectory for the autonomous vehicle to traverse in the environment. For example, the candidate trajectory may correspond to a path from a first location in a first lane of the multilane roadway to a second location in a second lane of the multilane roadway. Motion planning system 400 may generate the candidate trajectory by sampling trajectory parameters from respective parameter distributions to compose a candidate trajectory for evaluation. Motion planning system 400 may generate the candidate trajectory by optimizing an initial baseline trajectory toward an objective. The objective may include lane costs 410, dynamic costs 412, route costs 414, etc.

At 1012, example method 1000 may include (f) evaluating the candidate trajectory using an aggregate cost of the candidate trajectory, the aggregate cost computed using the lane cost profile and the dynamic cost profile. For example, the candidate trajectory may be associated with one or more locations in the environment at one or more times. Each respective location may be associated with a respective lane cost value and a respective dynamic cost value. An aggregate cost for the trajectory may include a combination of the respective costs. The respective location may be used to query an aggregate cost directly or may be used to individually query the component costs. Computing the aggregate cost using the lane cost profile and the dynamic cost profile may include executing lane costs 410 and dynamic costs 412 on a new query point location to obtain a cost value from the profiles respectively encoded by the cost functions. Computing the aggregate cost using the lane cost profile and the dynamic cost profile may include executing lane costs 410 and dynamic costs 412 over a sampling domain. Executing lane costs 410 and dynamic costs 412 over a sampling domain may operate to pre-compute numerical representations (or analytical expressions regressed to fit a pre-computed numerical representation) of the respective cost profiles. The aggregate cost may be obtained by retrieving cost values from the pre-computed cost data using a query point from the candidate trajectory.

At 1014, example method 1000 may include (g) determining a selected trajectory for execution by the autonomous vehicle based on the evaluation of the candidate trajectory. For example, motion planning system 400 may rank candidate trajectories 402 using trajectory scores 406 obtained from evaluator 404. Motion planning system 400 may select a top-ranked trajectory for execution.

At 1016, example method 1000 may include (h) controlling the autonomous vehicle according to the selected trajectory. For example, an autonomous vehicle control system may input a trajectory output by motion planning system 400 into a control system 260 for executing the selected trajectory.

In some implementations of example method 1000, generating the lane cost profile includes generating, using the map data, a wicket cost profile that includes a plurality of basins respectively associated with lane centerlines of the lanes. For example, a wicket may be located at a position along a lane or stream in map data 210. A wicket cost profile may include wicket costs 504. Wicket costs 504 may encode lane-centering costs, route costs 414, or other costs. In some implementations of example method 1000, for a respective lane, the wicket cost profile is registered to a centerline of the respective lane. For instance, a minimum of a basin of the wicket cost profile is aligned to a centerline of a corresponding lane.

In some implementations of example method 1000, generating the lane cost profile includes generating, using the map data, a boundary cost profile associated with lane boundaries of the lanes. For example, a boundary cost profile may include lane boundary costs 502. Lane boundary costs 502 may encode the cost of crossing a lane boundary. This cost may be specifically adapted (e.g., by motion planning system 400) for each boundary of each lane based on an attribute of the lane boundary.

In some implementations, example method 1000 includes obtaining, from the map data, a plurality of lane markers that respectively correspond to a plurality of locations in a roadway. In some implementations, example method 1000 includes obtaining a respective lane cost profile for each of the plurality of lane markers. For example, lane markers may include discrete locations sampled from a continuous path for a roadway stored in map data 210. For example, map data 210 may represent lanes and roadways as continuous paths. In another example, lane markers may be points subsampled from a discrete lane representation in map data 210. For instance, map data 210 may represent lanes and roadways in a discretized data structure (e.g., using waypoints, a graph structure with nodes and edges). Lane markers may include nodes or waypoints obtained directly from map data 210. Lane markers may correspond to discrete wicket locations that are sampled from the path. A lane cost profile may be generated (e.g., by motion planning system 400) for each wicket.

In some implementations, example method 1000 includes determining a plurality of route costs that penalize lane positions that increase a difficulty of navigating along a route for the autonomous vehicle through the environment. For example, route costs may include route costs 414. A difficulty of navigating along a route may be quantified by measuring an amount of work or actions associated with performing a desired navigational action or remedying a failure to perform a desired navigational action.

In some implementations of example method 1000, the plurality of route costs are determined based on a navigation action associated with the route for the autonomous vehicle through the environment. In some implementations of example method 1000, the plurality of route costs are determined based on a cost to execute the navigation action. For instance, a route cost may be based on how many lanes need to be crossed to execute a turn, a total path distance, a lane width, a turn angle, a number of turns, proximity to areas of dense traffic, etc.

In some implementations of example method 1000, the plurality of route costs are determined based on a cost of not executing the navigation action. For instance, a route cost may be determined based on a contingency route, such as a route to a destination computed based on failing to perform the action. For example, if the action is a turn, the contingency route may be a route from a position past the turn. The contingency route may include additional maneuvers to return to the turn location to attempt to perform the turn or may include maneuvers to traverse an alternative route that does not include the turn. The cost may be based on the complexity of the contingency route, a length of the contingency route, energy expended in excess of the original route, etc. In this manner, for instance, if the costs of missing a turn are very high, then the vehicle may prioritize trajectories that decrease a risk of failing to perform the navigational action. For instance, approaching an exit ramp navigational action, motion planning system 400 may generate route costs that have a lowest cost (e.g., zero cost) associated with a rightmost lane (from which the exit ramp departs), a medium cost level associated with zero, one, or more middle lane(s), and a highest cost associated with a leftmost lane. The cost may be discounted based on how far away the exit is from a current position of the vehicle. If missing the exit will result in significant delays, fuel burn, etc., the route costs may be higher in magnitude, thereby causing the vehicle to prioritize occupying the rightmost lane sooner. If missing the exit will not result in consequential delays or other issues, the route costs may be lower, such that the vehicle may select other trajectories that select the middle or leftmost lanes to avoid traffic, maintain momentum for conserving fuel, etc.

In some implementations, example method 1000 includes obtaining, from the map data, a plurality of lane markers that respectively correspond to a plurality of locations in a roadway. In some implementations, example method 1000 includes determining the plurality of route costs respectively for the plurality of locations, wherein the aggregate cost is computed using one or more of the plurality of route costs. For instance, at each wicket (obtained from map data 210), a route cost value may be computed. A route cost value may be constant for all lateral positions associated with the wicket.

In some implementations of example method 1000, generating the lane cost profile includes generating, using the map data, a wicket cost profile that includes a plurality of basins respectively associated with lane centerlines of the lanes, wherein the plurality of route costs are represented in the wicket cost profile. For instance, wicket costs 504 may include a route cost associated with a given wicket. In this manner, for instance, a respective basin of wicket costs 504 may be level-shifted by a route cost associated with the wicket corresponding to the respective basin. In some implementations of example method 1000, generating the lane cost profile includes generating, using the map data, a boundary cost profile associated with lane boundaries of the lanes. The boundary cost may be independent of the route costs.

In some implementations, example method 1000 includes, for a respective lane marker, generating a lane cost component that varies over the width of a lane associated with the respective lane marker. For instance, for a given wicket, a lane cost profile may map lane positions within a lane to cost values. In some implementations, example method 1000 includes, for the respective lane marker, generating a route cost component that is constant over the width of the lane. For instance, a route cost may not vary based on different positions in a lane, so a route cost may only be queried once per lane for a given longitudinal position (e.g., once per wicket).

In some implementations of example method 1000, (e) includes sampling a plurality of candidate trajectories, wherein the plurality of candidate trajectories includes at least one candidate trajectory associated with each respective lane of the multilane roadway. For example, to evaluate many different planning outcomes, motion planning system 400 may sample a diverse array of candidate trajectories. The sampling procedure may be conducted to facilitate diverse samples over a region of an environment. Given sufficient sampling count, it may be ensured (to a degree of confidence) that all available lanes will be covered.

Constraints may also be used by motion planning system 400 to generate or otherwise obtain trajectories that satisfy one or more desired criteria. For example, motion planning system 400 may use trajectory constraints whereby a number of candidate trajectories 402 may be constrained to represent a lane change to each available lane from a current position. For instance, for each respective available lane, an endpoint of a respective candidate trajectory may be constrained to occupy the respective lane. Remaining parameters may be sampled or otherwise populated based on the scene context to provide reasonable candidates for comparison. In this manner, for instance, motion planning system 400 may ensure that the vehicle considers possible lane changes in each planning cycle.

In some implementations of example method 1000, (f) includes evaluating, using the aggregate cost, a long-horizon trajectory associated with the candidate trajectory, wherein the long-horizon trajectory includes a coarse representation of a motion plan beyond a horizon of the candidate trajectory. For instance, a long-horizon trajectory may include sparse positional or temporal waypoints used to evaluate possible long-term outcomes of a particular planning decision. One or multiple long-horizon trajectories may extend and continue from a terminal point of a candidate trajectory.

In some implementations of example method 1000, the aggregate cost is computed with decreased precision for evaluations beyond the horizon of the candidate trajectory as compared to evaluations within the horizon of the candidate trajectory. For instance, sparse waypoints of a long-horizon trajectory may be used to query or execute a cost function. A data structure may include pre-computed cost values for a sparse array of query points in a region beyond the horizon of the candidate trajectory.

In some implementations of example method 1000, the lane cost is generated by sampling the map data to obtain a plurality of lane markers. In some implementations of example method 1000, the decreased precision (e.g., beyond the horizon of the candidate trajectories) is based on sampling the map data (e.g., to generate wickets) more sparsely for regions beyond the horizon of the candidate trajectory as compared to regions within the horizon of the candidate trajectory. For instance, a spatial or temporal sampling frequency may be reduced by half or more to achieve sparseness.

In some implementations of example method 1000, the decreased precision is based on sampling location data for the long-horizon trajectory more sparsely as compared to location data for the candidate trajectory. For instance, the decreased precision of cost computation may result from the inherent sparsity of example long-horizon trajectories that contain fewer waypoints.

Figure 11:
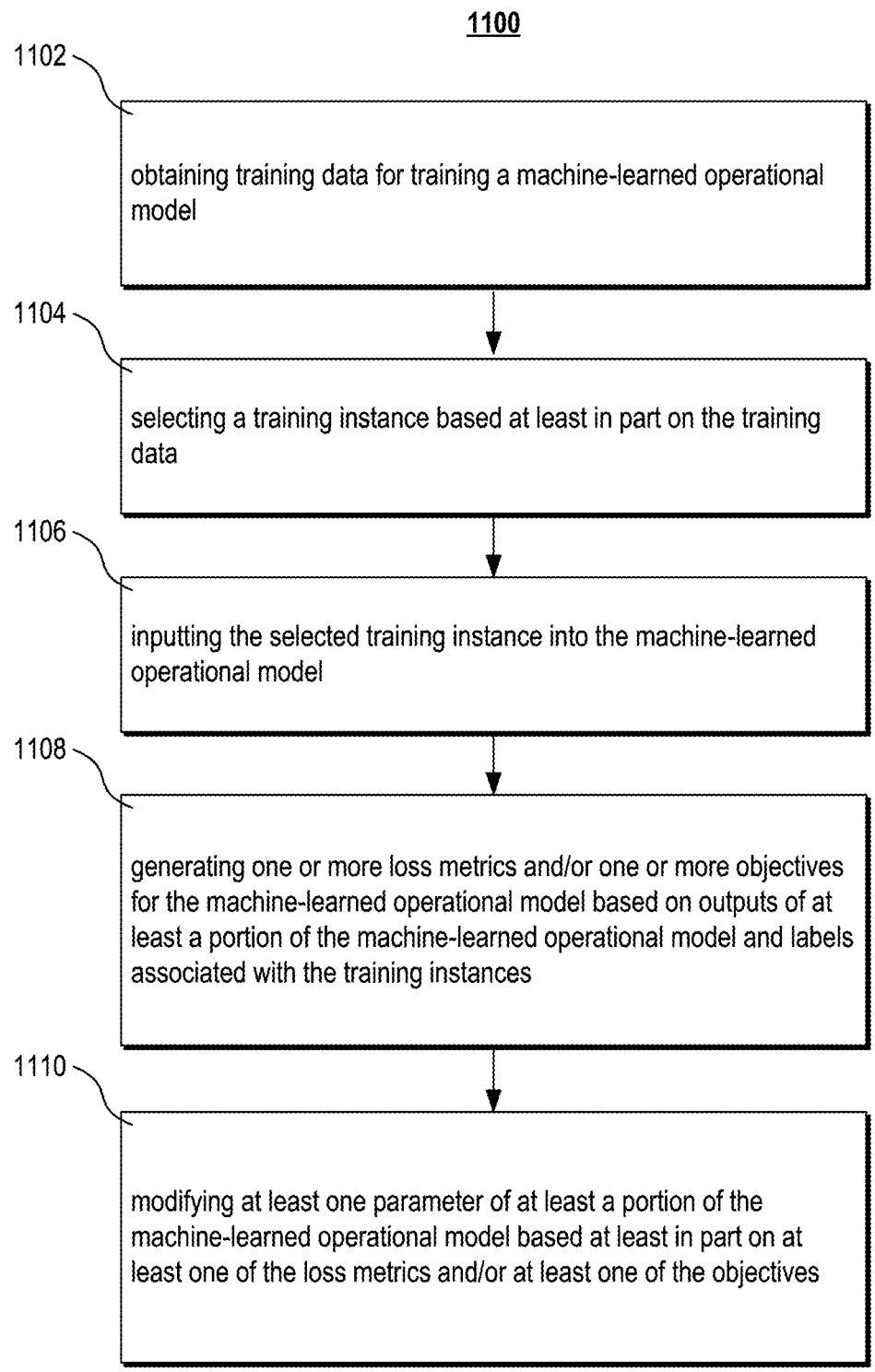
FIG. 11 is a flowchart of an example method for training a machine-learned operational system, according to some implementations of the present disclosure.

FIG. 11 is a flowchart of an example method 1100 for training one or more machine-learned operational models, according to aspects of the present disclosure. For instance, an operational system may include a machine-learned operational model. For example, one or more of localization system 230, perception system 240, planning system 250, control system 260, motion planning system 400, etc. may include a machine-learned operational model that may be trained according to example method 1100.

One or more portions of example method 1100 may be implemented by a computing system that includes one or more computing devices such as, for example, the computing systems described with reference to the other figures (e.g., autonomous platform 110, vehicle computing system 180, remote system 160, a system of FIGS. 1 to 12, etc.). Each respective portion of example method 1100 may be performed by any (or any combination) of one or more computing devices. Moreover, one or more portions of example method 1100 may be implemented on the hardware components of the devices described herein (e.g., as in FIGS. 1 to 12, etc.), for example, to validate one or more systems or models.

FIG. 11 depicts elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the present disclosure. FIG. 11 is described with reference to elements/terms described with respect to other systems and figures for exemplary illustrated purposes and is not meant to be limiting. One or more portions of example method 1100 may be performed additionally, or alternatively, by other systems.

At 1102, example method 1100 may include obtaining training data for training a machine-learned operational model. The training data may include a plurality of training instances.

The training data may be collected using one or more autonomous platforms (e.g., autonomous platform 110) or the sensors thereof as the autonomous platform 110 is within its environment. By way of example, the training data may be collected using one or more autonomous vehicles (e.g., autonomous platform 110, autonomous vehicle 110, autonomous vehicle 350, etc.) or sensors thereof as the vehicle operates along one or more travel ways. In some examples, the training data may be collected using other sensors, such as mobile-device-based sensors, ground-based sensors, aerial-based sensors, satellite-based sensors, or substantially any sensor interface configured for obtaining and/or recording measured data.

The training data may include a plurality of training sequences divided between multiple datasets (e.g., a training dataset, a validation dataset, or testing dataset). Each training sequence may include a plurality of pre-recorded perception datapoints, point clouds, images, etc. In some implementations, each sequence may include LIDAR point clouds (e.g., collected using LIDAR sensors of an autonomous platform 110), images (e.g., collected using mono or stereo imaging sensors, etc.), and the like. For instance, in some implementations, a plurality of images may be scaled for training and evaluation.

At 1104, example method 1100 may include selecting a training instance based at least in part on the training data. Selecting a training instances may include indexing a training dataset based on an index parameter and retrieving a training instance associated with the index parameter. Selecting a training instance may include iterating to a next element in a queue, list, or other iterable object.

At 1106, example method 1100 may include inputting the training instance into the machine-learned operational model.

At 1108, example method 1100 may include generating one or more loss metrics and/or one or more objectives for the machine-learned operational model based on outputs of at least a portion of the machine-learned operational model and labels associated with the training instances.

At 1110, example method 1100 may include modifying at least one parameter of at least a portion of the machine-learned operational model based at least in part on at least one of the loss metrics and/or at least one of the objectives. For example, a computing system may modify at least a portion of the machine-learned operational model based at least in part on at least one of the loss metrics and/or at least one of the objectives. For example, a machine-learned operational model may be a costing model configured to generate costs (e.g., lane costs 410, dynamic costs 412, or route costs 414). Modifying at least a portion of the machine-learned operational model based at least in part on at least one of the loss metrics and/or at least one of the objectives may include updating learnable parameters of the machine-learned operational model to increase a likelihood of costing a set of candidate trajectories such that a ground truth or preferred trajectory is the lowest cost trajectory of the set of candidate trajectories.

In some implementations, the machine-learned operational model may be trained in an end-to-end manner. For example, in some implementations, the machine-learned operational model may be fully differentiable.

After being updated, the operational model or the operational system including the operational model may be provided for validation. In some implementations, a validation system may evaluate or validate the operational system. The validation system may trigger retraining, decommissioning, etc. of the operational system based on, for example, failure to satisfy a validation threshold in one or more areas.

Figure 12:
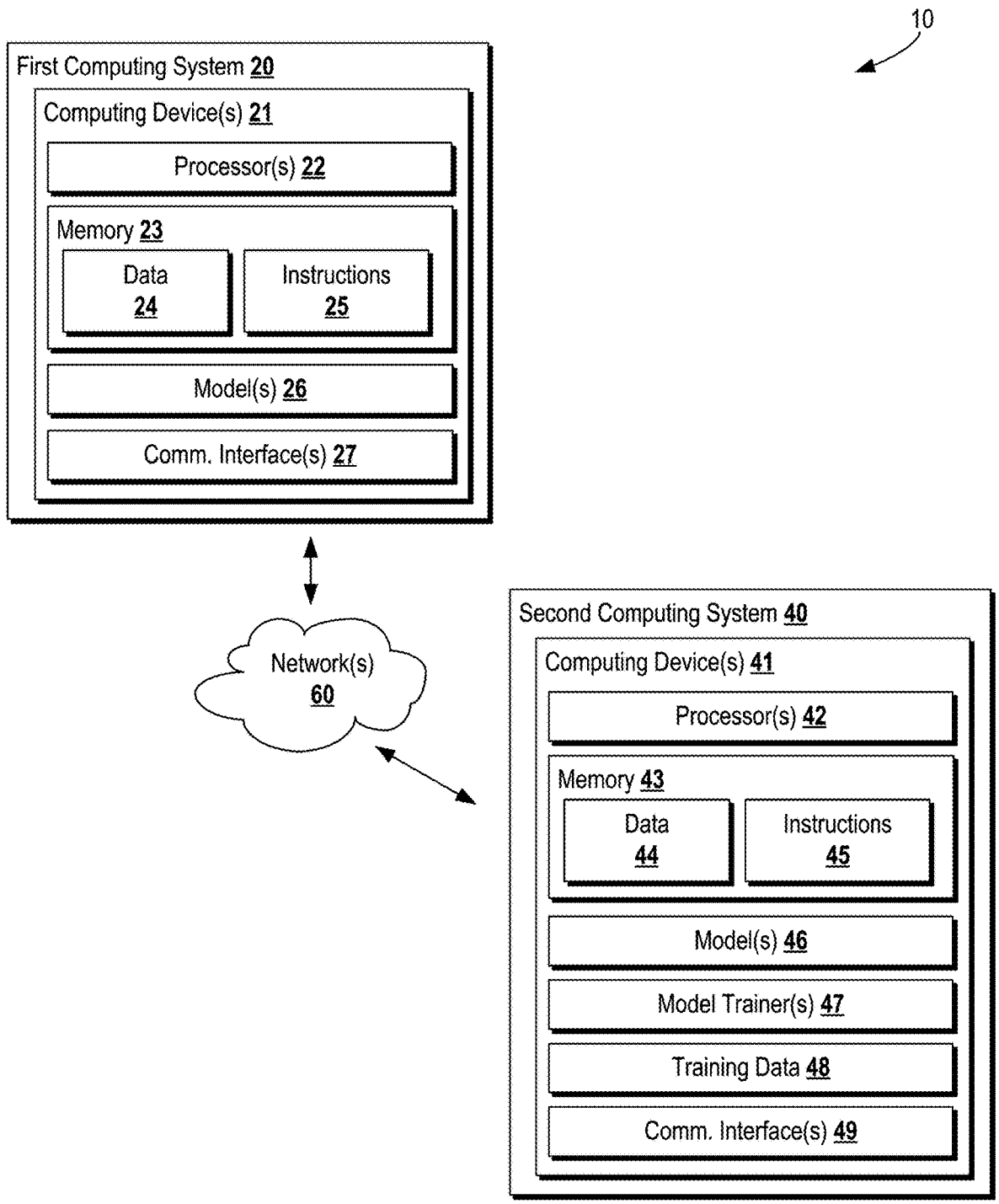
FIG. 12 is a block diagram of an example computing system, according to some implementations of the present disclosure.

FIG. 12 is a block diagram of an example computing ecosystem 10 according to example implementations of the present disclosure. The example computing ecosystem 10 may include a first computing system 20 and a second computing system 40 that are communicatively coupled over one or more networks 60. In some implementations, the first computing system 20 or the second computing 40 may implement one or more of the systems, operations, or functionalities described herein for validating one or more systems or operational systems (e.g., the remote system 160, the onboard computing system 180, the autonomy system 200, etc.).

In some implementations, the first computing system 20 may be included in an autonomous platform 110 and be utilized to perform the functions of an autonomous platform 110 as described herein. For example, the first computing system 20 may be located onboard an autonomous vehicle and implement autonomy system for autonomously operating the autonomous vehicle. In some implementations, the first computing system 20 may represent the entire onboard computing system or a portion thereof (e.g., the localization system 230, the perception system 240, the planning system 250, the control system 260, or a combination thereof, etc.). In other implementations, the first computing system 20 may not be located onboard an autonomous platform 110. The first computing system 20 may include one or more distinct physical computing devices 21.

The first computing system 20 (e.g., the computing devices 21 thereof) may include one or more processors 22 and a memory 23. The one or more processors 22 may be any suitable processing device (e.g., a processor core, a microprocessor, an ASIC, a FPGA, a controller, a microcontroller, etc.) and may be one processor or a plurality of processors that are operatively connected. Memory 23 may include one or more non-transitory computer-readable storage media, such as RAM, ROM, EEPROM, EPROM, one or more memory devices, flash memory devices, etc., and combinations thereof.

Memory 23 may store information that may be accessed by the one or more processors 22. For instance, the memory 23 (e.g., one or more non-transitory computer-readable storage media, memory devices, etc.) may store data 24 that may be obtained (e.g., received, accessed, written, manipulated, created, generated, stored, pulled, downloaded, etc.). The data 24 may include, for instance, sensor data, map data, data associated with autonomy functions (e.g., data associated with the perception, planning, or control functions), simulation data, or any data or information described herein. In some implementations, the first computing system 20 may obtain data from one or more memory devices that are remote from the first computing system 20.

Memory 23 may store computer-readable instructions 25 that may be executed by the one or more processors 22. Instructions 25 may be software written in any suitable programming language or may be implemented in hardware. Additionally, or alternatively, instructions 25 may be executed in logically or virtually separate threads on the processors 22.

For example, the memory 23 may store instructions 25 that are executable by one or more processors (e.g., by the one or more processors 22, by one or more other processors, etc.) to perform (e.g., with the computing devices 21, the first computing system 20, or other systems having processors executing the instructions) any of the operations, functions, or methods/processes (or portions thereof) described herein. For example, operations may include implementing system validation.

In some implementations, the first computing system 20 may store or include one or more models 26. In some implementations, the models 26 may be or may otherwise include one or more machine-learned models (e.g., a machine-learned operational system, etc.). As examples, the models 26 may be or may otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the first computing system 20 may include one or more models for implementing subsystems of the autonomy system 200, including any of: the localization system 230, the perception system 240, the planning system 250, or the control system 260.

In some implementations, the first computing system 20 may obtain the one or more models 26 using communication interface 27 to communicate with the second computing system 40 over the network 60. For instance, the first computing system 20 may store the models 26 (e.g., one or more machine-learned models) in memory 23. The first computing system 20 may then use or otherwise implement the models 26 (e.g., by the processors 22). By way of example, the first computing system 20 may implement the models 26 to localize an autonomous platform 110 in an environment, perceive an environment of the autonomous platform 110 or objects therein, plan one or more future states of an autonomous platform 110 for moving through an environment, control an autonomous platform 110 for interacting with an environment, etc.

The second computing system 40 may include one or more computing devices 41. The second computing system 40 may include one or more processors 42 and a memory 43. The one or more processors 42 may be any suitable processing device (e.g., a processor core, a microprocessor, an ASIC, a FPGA, a controller, a microcontroller, etc.) and may be one processor or a plurality of processors that are operatively connected. The memory 43 may include one or more non-transitory computer-readable storage media, such as RAM, ROM, EEPROM, EPROM, one or more memory devices, flash memory devices, etc., and combinations thereof.

Memory 43 may store information that may be accessed by the one or more processors 42. For instance, the memory 43 (e.g., one or more non-transitory computer-readable storage media, memory devices, etc.) may store data 44 that may be obtained. The data 44 may include, for instance, sensor data, model parameters, map data, simulation data, simulated environmental scenes, simulated sensor data, data associated with vehicle trips/services, or any data or information described herein. In some implementations, the second computing system 40 may obtain data from one or more memory devices that are remote from the second computing system 40.

Memory 43 may also store computer-readable instructions 45 that may be executed by the one or more processors 42. The instructions 45 may be software written in any suitable programming language or may be implemented in hardware. Additionally, or alternatively, the instructions 45 may be executed in logically or virtually separate threads on the processors 42.

For example, memory 43 may store instructions 45 that are executable (e.g., by the one or more processors 42, by the one or more processors 22, by one or more other processors, etc.) to perform (e.g., with the computing devices 41, the second computing system 40, or other systems having processors for executing the instructions, such as computing devices 21 or the first computing system 20) any of the operations, functions, or methods/processes described herein. This may include, for example, the functionality of the autonomy system 200 (e.g., localization, perception, planning, control, etc.) or other functionality associated with an autonomous platform 110 (e.g., remote assistance, mapping, fleet management, trip/service assignment and matching, etc.). This may also include, for example, validating a machined-learned operational system.

In some implementations, second computing system 40 may include one or more server computing devices. In the event that the second computing system 40 includes multiple server computing devices, such server computing devices may operate according to various computing architectures, including, for example, sequential computing architectures, parallel computing architectures, or some combination thereof.

Additionally, or alternatively to, the models 26 at the first computing system 20, the second computing system 40 may include one or more models 46. As examples, the models 46 may be or may otherwise include various machine-learned models (e.g., a machine-learned operational system, etc.) such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the second computing system 40 may include one or more models of the autonomy system 200.

In some implementations, the second computing system 40 or the first computing system 20 may train one or more machine-learned models of the models 26 or the models 46 through the use of one or more model trainers 47 and training data 48. The model trainer 47 may train any one of the models 26 or the models 46 using one or more training or learning algorithms. One example training technique is backwards propagation of errors. In some implementations, the model trainer 47 may perform supervised training techniques using labeled training data. In other implementations, the model trainer 47 may perform unsupervised training techniques using unlabeled training data. In some implementations, the training data 48 may include simulated training data (e.g., training data obtained from simulated scenarios, inputs, configurations, environments, etc.). In some implementations, the second computing system 40 may implement simulations for obtaining the training data 48 or for implementing the model trainer 47 for training or testing the models 26 or the models 46. By way of example, the model trainer 47 may train one or more components of a machine-learned model for the autonomy system 200 through unsupervised training techniques using an objective function (e.g., costs, rewards, metrics, constraints, etc.). In some implementations, the model trainer 47 may perform a number of generalization techniques to improve the generalization capability of the models being trained. Generalization techniques include weight decays, dropouts, or other techniques.

For example, in some implementations, the second computing system 40 may generate training data 48 according to example aspects of the present disclosure. For instance, the second computing system 40 may generate training data 48. For instance, the second computing system 40 may implement methods according to example aspects of the present disclosure. The second computing system 40 may use the training data 48 to train models 26. For example, in some implementations, the first computing system 20 may include a computing system onboard or otherwise associated with a real or simulated autonomous vehicle. In some implementations, models 26 may include perception or machine vision models configured for deployment onboard or in service of a real or simulated autonomous vehicle. In this manner, for instance, the second computing system 40 may provide a training pipeline for training models 26.

The first computing system 20 and the second computing system 40 may each include communication interfaces 27 and 49, respectively. The communication interfaces 27, 49 may be used to communicate with each other or one or more other systems or devices, including systems or devices that are remotely located from the first computing system 20 or the second computing system 40. The communication interfaces 27, 49 may include any circuits, components, software, etc. for communicating with one or more networks (e.g., the network 60). In some implementations, the communication interfaces 27, 49 may include, for example, one or more of a communications controller, receiver, transceiver, transmitter, port, conductors, software or hardware for communicating data.

The network 60 may be any type of network or combination of networks that allows for communication between devices. In some implementations, the network may include one or more of a local area network, wide area network, the Internet, secure network, cellular network, mesh network, peer-to-peer communication link or some combination thereof and may include any number of wired or wireless links. Communication over the network 60 may be accomplished, for instance, through a network interface using any type of protocol, protection scheme, encoding, format, packaging, etc.

FIG. 12 illustrates one example computing ecosystem 10 that may be used to implement the present disclosure. For example, one or more systems or devices of ecosystem 10 may implement any one or more of the systems and components described in the preceding figures. Other systems may be used as well. For example, in some implementations, the first computing system 20 may include the model trainer 47 and the training data 48. In such implementations, the models 26, 46 may be both trained and used locally at the first computing system 20. As another example, in some implementations, the computing system 20 may not be connected to other computing systems. Additionally, components illustrated or discussed as being included in one of the computing systems 20 or 40 may instead be included in another one of the computing systems 20 or 40.

Computing tasks discussed herein as being performed at computing devices remote from the autonomous platform 110 (e.g., autonomous vehicle) may instead be performed at the autonomous platform 110 (e.g., via a vehicle computing system of the autonomous vehicle), or vice versa. Such configurations may be implemented without deviating from the scope of the present disclosure. The use of computer-based systems allows for a great variety of possible configurations, combinations, and divisions of tasks and functionality between and among components. Computer-implemented operations may be performed on a single component or across multiple components. Computer-implemented tasks or operations may be performed sequentially or in parallel. Data and instructions may be stored in a single memory device or across multiple memory devices.

Aspects of the disclosure have been described in terms of illustrative implementations thereof. Numerous other implementations, modifications, or variations within the scope and spirit of the appended claims may occur to persons of ordinary skill in the art from a review of this disclosure. Any and all features in the following claims may be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, may refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein may be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. may be used to illustrate operations. Such identifiers are provided for the ease of the reader and do not denote a particular order of steps or operations. An operation illustrated by a list identifier of (a), (i), etc. may be performed before, after, or in parallel with another operation illustrated by a list identifier of (b), (ii), etc.

The term "can" should be understood as referring to a possibility of a feature in various implementations and not as prescribing an ability that is necessarily present in every implementation. For example, the phrase "X can perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

The term "may" should be understood as referring to a possibility of a feature in various implementations and not as prescribing an ability that is necessarily present in every implementation. For example, the phrase "X may perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

What is claimed is:

1. A computer-implemented method for controlling an autonomous vehicle, the method comprising:
    obtaining perception data that describes an environment of the autonomous vehicle, wherein the environment comprises a multilane roadway;
    generating, using the perception data, a dynamic cost profile associated with an object in the environment;
    obtaining map data describing lanes of the multilane roadway, wherein the map data stores data describing the multilane roadway in a graph having a plurality of nodes;
    generating, using the map data, a wicket cost profile that comprises a plurality of basins respectively associated with lane centerlines of the lanes, wherein the wicket cost profile is continuous between adjoining basins, wherein the wicket cost profile is generated based on data stored in a node of the plurality of nodes associated with a longitudinal position in the multilane roadway represented by the wicket cost profile;
    generating, using the map data, a boundary cost profile associated with lane boundaries of the lanes, wherein the boundary cost profile is continuous across lane boundaries of adjoining lanes of the multilane roadway;
    generating a candidate trajectory for the autonomous vehicle to traverse in the environment, wherein the candidate trajectory corresponds to a path from a first location in a first lane of the multilane roadway to a second location in a second lane of the multilane roadway;
    evaluating the candidate trajectory using an aggregate cost of the candidate trajectory, the aggregate cost computed using the lane cost profile and the dynamic cost profile;
    determining a selected trajectory for execution by the autonomous vehicle based on the evaluation of the candidate trajectory; and
    controlling the autonomous vehicle according to the selected trajectory.

2. The computer-implemented method of claim 1, wherein, for a respective lane:
    the wicket cost profile is registered to a centerline of the respective lane; and
    the boundary cost profile is registered to one or more outer boundaries of the respective lane.

3. The computer-implemented method of claim 1, comprising:
    obtaining, from the map data, a plurality of lane markers that respectively correspond to a plurality of locations in a roadway; and
    obtaining a respective lane cost profile for each of the plurality of lane markers.

4. The computer-implemented method of claim 1, comprising:
    determining a plurality of route costs that penalize lane positions that increase a difficulty of navigating along a route for the autonomous vehicle through the environment.

5. The computer-implemented method of claim 4, comprising:
    obtaining, from the map data, a plurality of lane markers that respectively correspond to a plurality of locations in a roadway;
    determining the plurality of route costs respectively for the plurality of locations, wherein the aggregate cost is computed using one or more of the plurality of route costs.

6. The computer-implemented method of claim 4, wherein generating the lane cost profile comprises:
    generating, using the map data, a wicket cost profile that comprises a plurality of basins respectively associated with lane centerlines of the lanes, wherein the plurality of route costs are represented in the wicket cost profile;
    generating, using the map data, a boundary cost profile associated with lane boundaries of the lanes.

7. The computer-implemented method of claim 4, wherein the plurality of route costs are determined based on a navigation action associated with the route for the autonomous vehicle through the environment.

8. The computer-implemented method of claim 7, wherein the plurality of route costs are determined based on a cost to execute the navigation action.

9. The computer-implemented method of claim 7, wherein the plurality of route costs are determined based on a cost of not executing the navigation action.

10. The computer-implemented method of claim 3, comprising:
    for a respective lane marker:
        generating a lane cost component that varies over a width of a lane associated with the respective lane marker; and
        generating a route cost component that is constant over the width of the lane.

11. The computer-implemented method of claim 1, comprising:
    sampling a plurality of candidate trajectories, wherein the plurality of candidate trajectories comprises at least one candidate trajectory associated with each respective lane of the multilane roadway.

12. The computer-implemented method of claim 1, comprising:
    evaluating, using the aggregate cost, a long-horizon trajectory associated with the candidate trajectory, wherein the long-horizon trajectory comprises a coarse representation of a motion plan beyond a horizon of the candidate trajectory.

13. The computer-implemented method of claim 12, wherein the aggregate cost is computed with decreased precision for evaluations beyond the horizon of the candidate trajectory as compared to evaluations within the horizon of the candidate trajectory.

14. The computer-implemented method of claim 13, wherein:
    the lane cost is generated by sampling the map data to obtain a plurality of lane markers; and
    the decreased precision is based on sampling the map data more sparsely for regions beyond the horizon of the candidate trajectory as compared to regions within the horizon of the candidate trajectory.

15. The computer-implemented method of claim 13, wherein the decreased precision is based on sampling location data for the long-horizon trajectory more sparsely as compared to location data for the candidate trajectory.

16. An autonomous vehicle control system for controlling an autonomous vehicle, the autonomous vehicle control system comprising:
one or more processors; and
one or more non-transitory computer-readable media storing instructions that are executable by the one or more processors to cause the autonomous vehicle control system to perform operations, wherein the operations comprise:
obtaining perception data that describes an environment of the autonomous vehicle, wherein the environment comprises a multilane roadway;
generating, using the perception data, a dynamic cost profile associated with an object in the environment;
obtaining map data describing lanes of the multilane roadway, wherein the map data stores data describing the multilane roadway in a graph having a plurality of nodes;
generating, using the map data, a wicket cost profile that comprises a plurality of basins respectively associated with lane centerlines of the lanes, wherein the wicket cost profile is continuous between adjoining basins, wherein the wicket cost profile is generated based on data stored in a node of the plurality of nodes associated with a longitudinal position in the multilane roadway represented by the wicket cost profile;
generating, using the map data, a boundary cost profile associated with lane boundaries of the lanes, wherein the boundary cost profile is continuous across lane boundaries of adjoining lanes of the multilane roadway;
generating a candidate trajectory for the autonomous vehicle to traverse in the environment, wherein the candidate trajectory corresponds to a path from a first location in a first lane of the multilane roadway to a second location in a second lane of the multilane roadway;
evaluating the candidate trajectory using an aggregate cost of the candidate trajectory, the aggregate cost computed using the lane cost profile and the dynamic cost profile;
determining a selected trajectory for execution by the autonomous vehicle based on the evaluation of the candidate trajectory; and
controlling the autonomous vehicle according to the selected trajectory.

17. The autonomous vehicle control system of claim 16, wherein the operations comprise:
determining a plurality of route costs that penalize lane positions that increase a difficulty of navigating along a route for the autonomous vehicle through the environment.

18. The autonomous vehicle control system of claim 17, wherein, for a respective lane:
the lane cost profile is registered to a centerline of the respective lane; and
the boundary cost profile is registered to one or more outer boundaries of the respective lane.

19. The autonomous vehicle control system of claim 17, the operations comprising:
evaluating, using the aggregate cost, a long-horizon trajectory associated with the candidate trajectory, wherein the long-horizon trajectory comprises a coarse representation of a motion plan beyond a horizon of the candidate trajectory;
wherein the aggregate cost is computed with decreased precision for evaluations beyond the horizon of the candidate trajectory as compared to evaluations within the horizon of the candidate trajectory;
wherein the lane cost is generated by sampling the map data to obtain a plurality of lane markers;
wherein the decreased precision is based on sampling the map data more sparsely for regions beyond the horizon of the candidate trajectory as compared to regions within the horizon of the candidate trajectory.

20. One or more non-transitory computer-readable media storing instructions that are executable by one or more processors to cause an autonomous vehicle control system to perform operations for controlling an autonomous vehicle, wherein the operations comprise:
obtaining perception data that describes an environment of the autonomous vehicle, wherein the environment comprises a multilane roadway;
generating, using the perception data, a dynamic cost profile associated with an object in the environment;
obtaining map data describing lanes of the multilane roadway, wherein the map data stores data describing the multilane roadway in a graph having a plurality of nodes;
generating, using the map data, a wicket cost profile that comprises a plurality of basins respectively associated with lane centerlines of the lanes, wherein the wicket cost profile is continuous between adjoining basins, wherein the wicket cost profile is generated based on data stored in a node of the plurality of nodes associated with a longitudinal position in the multilane roadway represented by the wicket cost profile;
generating, using the map data, a boundary cost profile associated with lane boundaries of the lanes, wherein the boundary cost profile is continuous across lane boundaries of adjoining lanes of the multilane roadway;
generating a candidate trajectory for the autonomous vehicle to traverse in the environment, wherein the candidate trajectory corresponds to a path from a first location in a first lane of the multilane roadway to a second location in a second lane of the multilane roadway;
evaluating the candidate trajectory using an aggregate cost of the candidate trajectory, the aggregate cost computed using the lane cost profile and the dynamic cost profile;
determining a selected trajectory for execution by the autonomous vehicle based on the evaluation of the candidate trajectory; and
controlling the autonomous vehicle according to the selected trajectory.

* * * * *